(12) United States Patent
Werdehausen et al.

(10) Patent No.: US 12,253,695 B2
(45) Date of Patent: Mar. 18, 2025

(54) DIFFRACTIVE OPTICAL ELEMENT, METHOD FOR DESIGNING AN EFFICIENCY-ACHROMATIZED DIFFRACTIVE STRUCTURE, AND METHOD FOR PRODUCING AN EFFICIENCY-ACHROMATIZED DIFFRACTIVE ELEMENT

(71) Applicant: Carl Zeiss AG, Oberkochen (DE)

(72) Inventors: Daniel Werdehausen, Jena (DE); Manuel Decker, Jena (DE)

(73) Assignee: Carl Zeiss AG, Oberkochen (DE)

( * ) Notice: Subject to any disclaimer, the term of this patent is extended or adjusted under 35 U.S.C. 154(b) by 631 days.

(21) Appl. No.: 17/603,714

(22) PCT Filed: Apr. 9, 2020

(86) PCT No.: PCT/EP2020/060216
§ 371 (c)(1),
(2) Date: Oct. 14, 2021

(87) PCT Pub. No.: WO2020/212257
PCT Pub. Date: Oct. 22, 2020

(65) Prior Publication Data
US 2022/0196896 A1 Jun. 23, 2022

(30) Foreign Application Priority Data
Apr. 15, 2019 (DE) .......................... 102019109944.7

(51) Int. Cl.
*G02B 5/18* (2006.01)
*B29C 64/386* (2017.01)
(Continued)

(52) U.S. Cl.
CPC .......... *G02B 5/1847* (2013.01); *B29C 64/386* (2017.08); *B29D 11/00769* (2013.01);
(Continued)

(58) Field of Classification Search
CPC ........................ G02B 5/1847; G02B 27/0012; G02B 5/1876; G02B 5/1809; G02B 27/4211;
(Continued)

(56) References Cited

U.S. PATENT DOCUMENTS 5,487,877 A 1/1996 Choi
5,847,877 A 12/1998 Imamura et al.
(Continued)

FOREIGN PATENT DOCUMENTS

DE 102005035550 A1 2/2007
DE 102006007432 A1 8/2007
(Continued)

OTHER PUBLICATIONS

C. Ribot et al., "Broadband and efficient diffraction"; Advanced Optical Materials; 7 (2013); 11 pages.
(Continued)

*Primary Examiner* — Darryl J Collins
*Assistant Examiner* — Matthew Y Lee
(74) *Attorney, Agent, or Firm* — Skaar Ulbrich Macari, P.A.

(57) ABSTRACT

The invention relates to a diffractive optical element with a spatial variation in the refractive index, wherein a sequence of adjacent sections, which form a diffractive structure, is formed by the spatial variation in the refractive index, within which sections the refractive index varies in each case. Over a spectral range extending over at least 300 nm, the diffractive structure has a diffraction efficiency of at least 0.95, averaged over the entire spectral range. The value of the diffraction efficiency of at least 0.95, averaged over the entire spectral range, is realized by a single single-layer diffractive structure with an optimized combination of at least two refractive indices and at least two Abbe numbers within each section of the sequence of adjacent sections. The (Continued)

refractive index variation can be achieved by means of doping, material mixing, or structuring into sub-wavelength ranges.

23 Claims, 7 Drawing Sheets

(51) Int. Cl.
  B29D 11/00 (2006.01)
  B33Y 50/00 (2015.01)
  B33Y 80/00 (2015.01)
  G02B 27/00 (2006.01)
(52) U.S. Cl.
  CPC ........ B29D 11/00951 (2013.01); B33Y 50/00 (2014.12); B33Y 80/00 (2014.12); G02B 27/0012 (2013.01)
(58) Field of Classification Search
  CPC .. G02B 27/4266; G02B 5/18; G02B 27/0037; G02B 5/1895; G02B 5/1852; G02B 5/1857; G02B 27/42; B29C 64/386; B29D 11/00769; B29D 11/00951; B33Y 50/00; B33Y 80/00; B33Y 10/00
  See application file for complete search history.

(56) References Cited

U.S. PATENT DOCUMENTS

| | | | |
|---|---|---|---|
| 6,873,463 B2 | 3/2005 | Nakai | |
| 6,912,092 B2 | 6/2005 | Ukuda | |
| 7,031,078 B2 | 4/2006 | Ukuda | |
| 7,196,132 B2 | 3/2007 | Ukuda | |
| 7,663,803 B2 | 2/2010 | Ukuda et al. | |
| 8,773,783 B2 | 7/2014 | Maetaki | |
| 9,422,414 B2 | 8/2016 | Iwasa | |
| 9,696,469 B2 | 7/2017 | Genda et al. | |
| 2001/0013975 A1 | 8/2001 | Nakai | |
| 2004/0051949 A1 | 3/2004 | Ukuda | |
| 2007/0103782 A1* | 5/2007 | Lee | G02B 5/1871 359/565 |
| 2011/0026118 A1 | 2/2011 | Seesselberg et al. | |
| 2011/0090566 A1 | 4/2011 | Ukuda | |
| 2011/0157701 A1* | 6/2011 | Yamada | G02B 27/4205 359/571 |
| 2012/0050868 A1* | 3/2012 | Takayama | G02B 27/4288 359/566 |
| 2012/0120494 A1* | 5/2012 | Takayama | G02B 13/04 359/576 |
| 2012/0200925 A1* | 8/2012 | Iwasa | G02B 1/04 522/33 |
| 2013/0057956 A1 | 3/2013 | Iwasa | |
| 2013/0235460 A1* | 9/2013 | Iwasa | G02B 5/1876 359/576 |
| 2019/0146242 A1 | 5/2019 | Mappes et al. | |
| 2020/0189212 A1* | 6/2020 | Van Bommel | B29D 11/00432 |

FOREIGN PATENT DOCUMENTS

| | | |
|---|---|---|
| EP | 1148355 A1 | 10/2001 |
| WO | 2014179780 A1 | 11/2014 |
| WO | 2017058146 A1 | 4/2017 |

OTHER PUBLICATIONS

B.H. Kleemann et al.; "Design concepts for broadband high-efficiency DOEs"; Journal of the European Optical Society—Rapid Publications 3; Apr. 17, 2008; 16 pages.

P. Lalanne; "Waveguiding in blazed-binary diffractive elements"; J. Opt. Soc. Am. A. 16; Oct. 1999; 4 pages.

International Preliminary Report on Patentability rendered by the International Bureau of WIPO for PCT/EP2020/060216, dated Sep. 28, 2021, 10 pages.

International Search Report rendered by the International Bureau of WIPO for PCT/EP2020/060216, dated Sep. 23, 2020, 3 pages.

B.H. Kleemann et al.; "Design concepts for broadband high-efficiency EA-DOEs"; DGaO Proceedings 2008; http://www.dgao-proceedings.de; 2008; 2 pages.

* cited by examiner

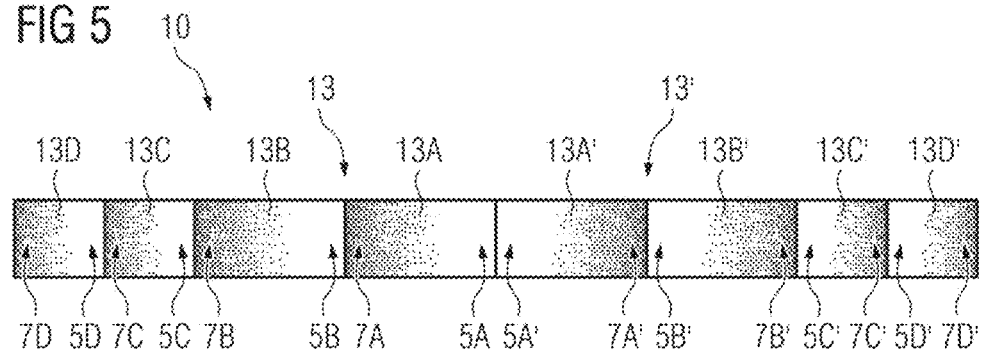
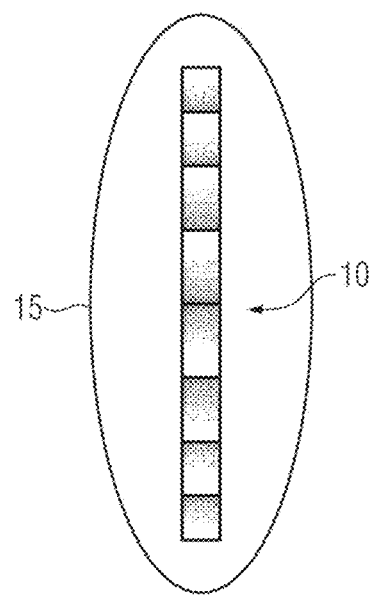

DIFFRACTIVE OPTICAL ELEMENT, METHOD FOR DESIGNING AN EFFICIENCY-ACHROMATIZED DIFFRACTIVE STRUCTURE, AND METHOD FOR PRODUCING AN EFFICIENCY-ACHROMATIZED DIFFRACTIVE ELEMENT

The project leading to this application has received funding from the European Union's Horizon 2020 research and innovation programme under the Marie Skłodowska-Curie grant agreement No 675745.

PRIORITY

This application claims the benefit of German Patent Application No. 10 2019 109 944.7, filed on Apr. 15, 2019, and which is hereby incorporated herein by reference in its entirety.

FIELD

The present invention relates to a diffractive optical element (DOE) with a diffractive structure with a spatial variation in the refractive index. Additionally, the invention relates to a method for designing an efficiency-achromatized diffractive structure and a method for producing an efficiency-achromatized diffractive element.

BACKGROUND

By way of example, diffractive optical elements are used for spectrally splitting light and for deflecting light. Such elements are based on the principle of the diffraction of light waves and are designed to deflect light at a specific wavelength into a specific direction with the aid of a diffractive structure, i.e., with the aid of a diffraction grating. The diffraction efficiency of a diffractive optical element, which depends on the grating profile within a period, is a measure of what component of the light incident at the grating structure is diffracted into a specific order of diffraction, i.e., into the desired direction. In this case, the diffraction efficiency represents the ratio of the energy flux propagating in the desired order of diffraction to the total energy flux transmitted. In principle, what can be achieved for a specific wavelength, the so-called design wavelength of the diffractive optical element, is that, if shadowing effects are neglected, all of the light at the design wavelength is diffracted into the same order of diffraction and consequently deflected in the same direction, and so a diffraction efficiency of 1 (or 100%) can be achieved for the design wavelength (a so-called blazed grating or echelette grating). However, this does not apply to wavelengths deviating from the design wavelength. Light at a wavelength deviating from the design wavelength is deflected into different diffraction maxima, and hence into different directions. In the case of the diffraction of polychromatic light, this leads to stray light outside of the order of diffraction and hence to loss of resolution.

Therefore, diffractive optical elements have been developed, which are able to obtain a high diffraction efficiency in a specific order of diffraction—usually the first order of diffraction—for all wavelengths from a specific wavelength range. Such diffractive optical elements are referred to as efficiency-achromatized diffractive optical elements. Accordingly, efficiency-achromatized diffractive optical elements are diffractive optical elements for which a high diffraction efficiency is obtained for a specific order of diffraction for all wavelengths of a specific wavelength range. By way of example, C. Ribot et al., "Broadband and Efficient Diffraction" in Advanced Optical Materials 7 (2013) have described an efficiency-achromatized metalens in the infrared.

There are various approaches for producing efficiency-achromatized diffractive optical elements. By way of example, U.S. Pat. Nos. 6,873,463, 9,696,469, US 2001/013975, and U.S. Pat. No. 5,487,877 propose the use of multi-layer diffractive optical elements in order to bring about efficiency achromatization. DE 10 2006 007 432 A1, US 2011/026118 A1, U.S. Pat. Nos. 7,663,803, 6,912,092, US 2013/057956 A1, US 2004/051949 A1 and U.S. Pat. No. 5,847,887 have moreover disclosed the adjustment of the refractive index of one of the layers of multi-layer diffractive optical elements such that the dispersion of another layer is canceled. US 2011/090566 A1, U.S. Pat. Nos. 9,422,414, 7,031,078, 7,663,803, 7,196,132, and 8,773,783 have disclosed diffractive optical elements, in which use is made of materials with anomalous dispersion in order to bring about an efficiency achromatization.

In the case of diffractive optical elements with periods that are very long in relation to the wavelength of the light to be diffracted, single-layer diffractive optical elements can be designed in such a way that, in theory, a diffraction efficiency of 100% is attained for a specified design wavelength ($\lambda_0$). However, if the wavelength deviates from this design wavelength, there is a significant reduction in the diffraction efficiency when the deviation from the design wavelength increases. This leads to unwanted stray light in optical imaging systems and, as a result, prevents the use of such diffractive optical elements in broadband optical systems. This problem can be solved by virtue of adding an additional diffractive layer that is made from a material with a different refractive index, as described in U.S. Pat. Nos. 6,873,463, 9,696,459, and US 2001/013975 A1, for example. In this case, the two layers can have different profile heights, which can be matched to one another in order to maximize the average diffraction efficiency in the desired wavelength range, as described in, for example, B. H. Kleemann et al., "*Design-concepts for broadband high-efficiency DOEs*", Journal of the European Optical Society-Rapid publications 3 (2008). However, on the other hand, the average diffraction efficiency in the desired wavelength range can be maximized in the case of the same profile height of the layers by way of a suitable choice of the second material. While diffractive optical elements with different profile heights are typically referred to as multilayer DOEs, diffractive optical elements with the same profile height of the layers are usually referred to as "common depth DOEs". In order to realize a common depth DOE, it is necessary to choose material combinations whose dispersion compensate one another to the best possible extent. By way of example, common depth DOEs are described in DE 10 2006 007 432 A1, US 2011/0026118 A1, U.S. Pat. Nos. 7,663,803, 6,912, 092, US 2012/0597741 A1, US 2004/051949 A1, and U.S. Pat. No. 5,847,877. Both approaches have already been implemented in commercially available camera lenses.

By way of example, diffractive optical elements can be realized with inclined faces, as is the case in the aforementioned multilayer DOEs and common depth DOEs. An alternative approach for producing diffractive optical elements consists of periodically varying the refractive index within the element as a function of location. As a result, a so-called gradient index DOE, also abbreviated GRIN DOE, is attained. However, the diffraction efficiency of a gradient index DOE depends significantly on wavelength. This problem is known from other single-layer diffractive optical elements and can be circumvented by virtue of applying a second GRIN DOE layer in a manner analogous to a multilayer DOE, as described, for example, in the publication by B. H. Kleemann cited above. However, a two-layer diffractive optical element is thus once again obtained, as a result of which the height of the overall system increases.

SUMMARY

It is an object herein to provide an efficiency-achromatized diffractive optical element, which can be produced with a low profile height. Another object herein is to provide a method for designing an efficiency-achromatized diffractive structure, which facilitates the production of an efficiency-achromatized diffractive optical element with a low profile height. A further object is to provide a method with which an efficiency-achromatized diffractive optical element with a low profile height can be produced.

A diffractive optical element (DOE) according to certain example embodiments has a single diffractive structure with a spatial variation in the refractive index. That spatial variation in the refractive index forms a sequence of adjoining sections, within which the refractive index varies in each case and which form a diffractive structure. The diffractive optical element according to certain example embodiments consequently is a GRIN DOE. The sequence of adjoining sections can form a periodic structure. Instead of a periodic structure, the sections can alternatively also form a structure with variable lateral dimensions of the sections, which leads to a diffraction angle that varies in defined fashion as a function of location on the diffractive structure, for example in order to obtain, for example, a focusing effect, a defocusing effect, an image aberration-compensating effect, or any other optical effect in addition to the deflecting effect of the structure.

Over a spectral range extending over at least 300 nm and preferably extending over at least 350 nm, the diffractive structure has a diffraction efficiency averaged over this spectral range of at least 0.95. In this case, the spectral range can be a section of the visible spectral range; in particular, the spectral range can be the entire visible spectral range, i.e., the spectral range from 400 to 800 nm or, specified with slightly tighter boundaries, from 400 to 750 nm.

The diffractive optical element according to certain example embodiments is distinguished by virtue of the value of the diffraction efficiency of at least 0.95 averaged over the spectral range of at least 300 nm being realized by a single one-layer diffractive structure with a combination of at least an optimized maximum refractive index $n_{max}$ and an optimized minimum refractive index $n_{min}$ and at least an optimized high Abbe number $v_{max}$ and an optimized low Abbe number min within each section of the sequence of adjoining sections.

The diffractive optical element according to certain example embodiments can be produced with a low profile height on account of the fact that the diffraction efficiency of at least 0.95 averaged over the spectral range is produced by a single one-layer diffractive structure. The lower the profile height of the diffractive structure, the smaller the shadowing effects caused by the profile height. The smaller the shadowing effects, the slower the diffraction efficiency drops when the angle of incidence of the light is increased and/or when the lateral extent of the sections of the sequence of adjoining sections is reduced.

In an advantageous configuration of the diffractive optical element, the value of the diffraction efficiency of at least 0.95 averaged over the spectral range of at least 300 nm is realized by a single one-layer diffractive structure with a combination of at least an optimized maximum refractive index $n_{max}$ at a specific wavelength of the spectral range of at least 300 nm, an optimized minimum refractive index $n_{min}$ at the specific wavelength of the spectral range of at least 300 nm, an optimized high Abbe number $v_{max}$ and an optimized low Abbe number min and optionally an optimized first part partial dispersion and an optimized second part partial dispersion within each section of the sequence of adjoining sections.

The refractive index is a wavelength-dependent variable, the wavelength dependence of which can be described by the Cauchy equation, for example, especially in the visible spectral range. Therefore, two differently parameterized Cauchy equations are required to describe the wavelength dependence of the optimized maximum refractive index $n_{max}$ and the optimized minimum refractive index $n_{min}$. Since the wavelength dependence of the Cauchy equation can be set to a sufficient approximation by the value of the refractive index at a specific wavelength together with the value of the Abbe number and the value of the part partial dispersion, this configuration allows the optimization of the wavelength-dependent maximum refractive index $n_{max}$ and of the wavelength-dependent minimum refractive index $n_{min}$ by optimizing six parameters, specifically the maximum refractive index $n_{max}$ at the specific wavelength, the minimum refractive index $n_{min}$ at the specific wavelength, the high Abbe number $v_{max}$, the low Abbe number $v_{min}$, the first part partial dispersion, and the second part partial dispersion. Since the dependence of the Cauchy equation on the part partial dispersion has less of an effect on the value of the diffraction efficiency averaged over the spectral range of at least 300 nm, the part partial dispersions can each be kept at a specified value without varying these within the optimization.

With the optimized values for the maximum refractive index $n_{max}$ at the specific wavelength of the spectral range, for the minimum refractive index $n_{min}$ at the specific wavelength of the spectral range, for the high Abbe number $v_{max}$, and for the low Abbe number $v_{min}$, and optionally for the first part partial dispersion and for the second part partial dispersion, the difference $\Delta n(\lambda)=n_{max}(\lambda)-n_{max}(\lambda)$ as a function of the wavelength $\lambda$ is largely linear over the spectral range of at least 300 nm.

In the diffractive optical element according to certain example embodiments, the optimized high Abbe number $v_{max}$ is preferably located in the region with the optimized maximum refractive index $n_{max}$ and the optimized low Abbe number min is preferably located in the region with the optimized minimum refractive index $n_{min}$. This goes against the trend of optical materials of having a lower Abbe number with increasing refractive index and is facilitated, for example, by the use of doped or mixed optical materials.

In the diffractive optical element according to certain example embodiments, it is advantageous if the refractive index difference $\Delta n$ between the optimized maximum refractive index $n_{max}$ and the optimized minimum refractive index $n_{min}$ at least at the specific wavelength has at least a value of 0.005, in particular at least a value of 0.01 and preferably at least a value of 0.015, since the profile height of the diffractive structure can be kept lower with increasing refractive index difference $\Delta n$.

In the diffractive optical element according to certain example embodiments, it is advantageous if the Abbe number difference $\Delta v$ between the optimized high Abbe number $v_{max}$ and the optimized low Abbe number $v_{min}$ has at least a value of 8, in particular at least a value of 15, preferably at least a value of 30. The greater the Abbe number difference $\Delta v$, the higher the refractive index difference $\Delta n$ can be, by means of which it is possible to attain the diffraction efficiency of at least 0.95 averaged over the spectral range, which in turn allows the realization of lower profile heights of the diffractive structure.

In the diffractive optical element according to certain example embodiments, at least two maxima of the spectral diffraction efficiency can be present in the spectral range extending over at least 300 nm, preferably over at least 350 nm. While the diffraction efficiency averaged over the spectral range of at least 300 nm represents a value for the diffraction efficiency averaged over the spectral range, the spectral diffraction efficiency represents the diffraction efficiency as a function of the wavelength of the diffracted light. If the spectral diffraction efficiency has at least two maxima, it is possible to obtain a uniform curve of the spectral diffraction efficiency over the spectral range for a certain value of the diffraction efficiency averaged over the spectral range of at least 300 nm, particularly if, in the case of two maxima of the spectral diffraction efficiency, the wavelengths at which the maxima are located differ from one another by at least 150 nm, preferably by at least 200 nm. In the case of more than two maxima, this is particularly the case if the wavelengths at which the outer two maxima are located differ from one another by at least 150 nm, preferably by at least 200 nm.

The diffractive structure of the diffractive optical element according to certain example embodiments can consist of or include a doped material or a material mixed from at least two materials with different refractive indices. The spatial variation in the refractive index is then based on a variation of the doping or a variation of the mixing ratio. The production of the diffractive structure can then be implemented relatively easily by introducing a spatially varying doping or by 3-D printing with a time-varying mixing ratio of the mixed material supplied. If a printer with a plurality of printing nozzles is used, it is also possible to use a mixing ratio that varies by way of the nozzles instead of a mixing ratio that varies over time.

However, the diffractive optical element according to certain example embodiments can also be embodied as a so-called metasurface. A metasurface consists of so-called meta-atoms, i.e., building blocks in the nanometer range that are smaller than the wavelength but nevertheless consist of several thousand atoms or molecules. In this case, varying the properties of the meta-atoms allows the phase and the amplitude of an incident wavefront to be varied as a function of location with sub-wavelength resolution. In order to avoid losses, designs which only vary the phase are usually sought after. This allows a diffractive optical element (DOE) to be realized. A diffractive optical element according to certain example embodiments realized as a metasurface has a diffractive structure which is constructed from alternating first regions of a first material with a first refractive index and second regions of a second material with a second refractive index that is higher than the first refractive index. Then, the first and second regions in each case alternate within the sections of the sequence of sections, wherein the width of the second regions vis-à-vis the width of the first regions within the sections respectively increases from one end of the section to the other end of the section. The greatest width of the first regions and of the second regions is always less than the mean wavelength of the spectral range extending over at least 300 nm. As a result, it is possible to provide an effective refractive index that depends on the refractive index of the first regions and the refractive index of the second regions, and the volumetric ratio of the first and second regions within a given volume. Particularly if the greatest width of the first regions and of the second regions is less than 0.3-times the mean wavelength of the spectral range extending over at least 300 nm, the diffractive structure then forms a metasurface which substantially acts on the wavefront as if it had an effective refractive index that continuously increases from one end of a respective section to the other end of the respective section. Alternatively, there is the option that the greatest width of at least the second regions is at least 0.3-times the mean wavelength of the spectral range extending over at least 300 nm and is no more than 1.0-times the mean wavelength of the spectral range extending over at least 300 nm. As a result, the second regions act like waveguides where they attain their maximum width, which, as per P. Lalanne "Waveguiding in blazed-binary diffractive elements", J. Opt. Soc. Am. A 16 (1999), may lead to reduction of shadowing effects in comparison with a diffractive element with a continuously increasing refractive index. If the greatest width of at least the second regions reduces and reaches the value of approximately 0.3-times the mean wavelength of the spectral range extending over at least 300 nm, there is a continuous transition between the metasurface with a waveguide effect and the metasurface without waveguide effect. In this transition region, there can still be a waveguide effect for short wavelengths of the wavelength range, in particular, but this effect may have already disappeared for long wavelengths.

According to certain example embodiments, a refractive or reflective optical element is moreover made available, the latter including a diffractive optical element according to certain example embodiments. Further optical degrees of freedom can be added to the refractive or reflective optical element by means of diffractive optical elements. By way of example, a diffractive optical element can be used to integrate Fresnel zones into a lens, which lead to the lens having a plurality of focal distances, one of the focal distances being based on refraction and the remaining focal distances being based on diffraction. In this way, it is possible to create multifocal intraocular lenses, for example. Such applications are also conceivable in the case of a mirror, with one of the focal distances then being based on the reflection of light. Moreover, on account of the different wavelength dependencies of the refractive focal distance and the diffractive focal distance, it is possible by means of a diffractive optical element integrated into a lens to correct the chromatic aberration of said lens.

In the method according to certain example embodiments for designing an efficiency-achromatized diffractive structure consisting of a material with a spatial variation in the refractive index, wherein as a result of the spatial variation in the refractive index a sequence of adjoining sections is formed and the refractive index within the sections in each case varies between a maximum refractive index and a minimum refractive index, a spectral range extending over at least 300 nm, preferably over at least 350 nm, and a diffraction efficiency to be obtained averaged over the spectral range of at least 300 nm, preferably at least 350 nm, are specified and at least the maximum refractive index $n_{max}$ and the minimum refractive index $n_{min}$ within the sections and a high Abbe number $v_{max}$ assigned to the maximum refractive index $n_{max}$ and a low Abbe number min assigned to the minimum refractive index $n_{min}$ within the sections are optimized in such a way that at least the diffraction efficiency to be obtained averaged over the entire spectral range is attained.

With the aid of the method according to certain example embodiments for designing an efficiency-achromatized diffractive structure, it is possible to realize an efficiency-achromatized diffractive structure having only a single diffractive layer. As a result, it is possible to keep the profile height of the diffractive structure low. For the diffraction efficiency averaged over the spectral range of at least 300 nm, preferably at least 350 nm, to be attained, it is possible here to specify, in particular, a value of at least 0.95 in order to obtain the best possible efficiency achromatization with the diffractive structure.

In addition to the maximum refractive index $n_{max}$, the minimum refractive index $n_{min}$, the high Abbe number $v_{max}$, and the low Abbe number $v_{min}$, a first part partial dispersion assigned to the maximum refractive index $n_{max}$ and a second part partial dispersion assigned to the minimum refractive index $n_{min}$ can also be optimized in an advantageous configuration of the method according to certain example embodiments, in such a way that at least the specified diffraction efficiency averaged over the spectral range of at least 300 nm, preferably at least 350 nm, is attained.

As already mentioned, the wavelength dependence of the Cauchy equation can be set to a sufficient approximation by the value of the refractive index at a specific wavelength together with the value of the Abbe number and the value of the part partial dispersion. The described advantageous configuration of the method therefore allows the optimization to be carried out on the basis of an optimization of no more than six parameters, specifically the maximum refractive index $n_{max}$ at the specific wavelength, the minimum refractive index $n_{min}$ at the specific wavelength, the high Abbe number $v_{max}$, and the low Abbe number $v_{min}$, and optionally the first part partial dispersion and the second part partial dispersion. The parameters of the Cauchy equation are sufficiently determined by these six values such that the wavelength dependence of the maximum refractive index $n_{max}$ and the wavelength dependence of the minimum refractive index $n_{min}$ are sufficiently well determined. Using the optimized values for the maximum refractive index $n_{max}$ at the specific wavelength of the spectral range, for the minimum refractive index $n_{min}$ at the specific wavelength of the spectral range, for the high Abbe number $v_{max}$, and for the low Abbe number $v_{min}$, and optionally for the first part partial dispersion and for the second part partial dispersion, the difference $\Delta n(\lambda)=n_{max}(\lambda)-n_{max}(v)$ as a function of the wavelength $\lambda$ extends substantially linearly over the spectral range of at least 300 nm.

Within the scope of the method according to certain example embodiments for designing an efficiency-achromatized diffractive structure, the optimization of the maximum refractive index $n_{max}$, of the minimum refractive index $n_{min}$, of the high Abbe number $v_{max}$, and of the low Abbe number $v_{min}$, and optionally of the first part partial dispersion and of the second part partial dispersion can be implemented in such a way that, in the process, the profile height h of the diffractive structure is minimized or at least does not exceed a specified maximum value. As a result, it is possible to minimize shadowing effects, leading to a slower drop of the diffraction efficiency averaged over the spectral range of at least 300 nm, preferably at least 350 nm, in the case of larger angles of incidence and/or smaller lateral dimensions of the lateral sections of the diffractive structure.

In particular, the maximum refractive index $n_{max}$, the minimum refractive index $n_{min}$, the high Abbe number $v_{max}$, and the low Abbe number $v_{min}$ and, optionally, the first part partial dispersion and the second part partial dispersion can be optimized in the method according to certain example embodiments for designing an efficiency-achromatized diffractive structure, in such a way that at least two maxima of the spectral diffraction efficiency are present in the spectral range. As a result, it is possible to obtain a uniform curve of the spectral diffraction efficiency over a large part of the specified spectral range. In particular, what can be achieved is that the spectral diffraction efficiency between the maxima does not drop below 0.95, preferably not below 0.97 and in particular not below 0.98, and so a high spectral diffraction efficiency is attained over a large part of the specified spectral range. Here, the wavelengths at which the maxima are located in the case of two maxima advantageously differ from one another by at least 150 nm, preferably by at least 200 nm, in order to design the wavelength range in which this high diffraction efficiency is attained to be as broad as possible. In the case of more than two maxima, the wavelengths at which the two outer maxima are located differ by at least 150 nm, preferably by at least 200 nm, from one another.

In the method for designing an efficiency-achromatized diffractive structure, the sequence of adjoining sections can form a periodic structure, in particular. However, it can also form a sequence of sections of different widths in order to thereby add further optical properties to the diffractive structure. By way of example, the diffractive structure can become a focusing structure or become a defocusing structure with the aid of a sequence of sections of different widths, and so it can act as a diffraction lens. However, other configurations of the diffractive structure are possible with the aid of a sequence of sections of different widths; by way of example, the diffractive structure can be made an imaging aberration-compensating structure with the aid of sections of different width.

The method according to certain example embodiments facilitates the design of diffractive efficiency-achromatized structures for the production of efficiency-achromatized diffractive optical elements.

Furthermore, a method for producing a diffractive optical element is provided. In certain example embodiments of this method, a diffractive structure is designed according to the method according to certain example embodiments for designing a diffractive efficiency-achromatized structure. This diffractive structure is then created using doped materials and varying the doping or with the aid of mixed materials and varying the mixing ratio, wherein the doping or the mixing ratio determines at least the refractive index and the Abbe number of the doped or mixed material. In this case, the doping is varied or the mixing ratio is varied in such a way that at least the variation in the refractive index and in the Abbe number arising from the optimization are realized by varying the doping or varying the mixing ratio.

With the aid of the doping or material mixing, it is consequently possible to create an optical element with the designed diffractive structure, for example by virtue of the diffractive structure being printed by means of 3-D printing and a doped or mixed printed material, the doping or the mixing ratio of which is varied during printing.

Alternatively, producing the diffractive optical element can include the introduction of a spatially varying doping into a body made of a base material.

Further features, properties and advantages of the present invention arise from the following description of exemplary embodiments, with reference being made to the attached drawings.

BRIEF DESCRIPTION OF THE DRAWINGS

FIG. 5 shows a second exemplary embodiment of a diffractive optical element.

FIG. 6 shows a schematic illustration of a lens with an integrated diffractive optical element.

Figure 1:
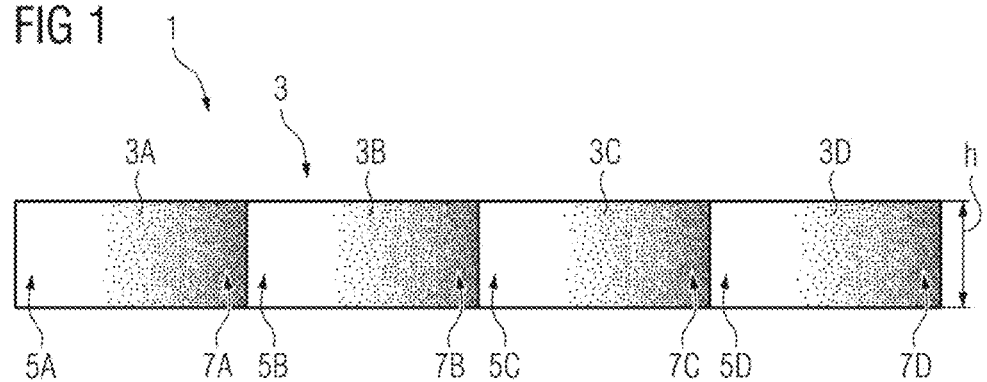
FIG. 1 shows a first exemplary embodiment of a diffractive optical element.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

A first exemplary embodiment of a diffractive optical element according to the invention is described below with reference to FIGS. 1 to 4. FIG. 1 shows a section of a diffractive optical element 1 which has a diffractive structure 3 formed from a sequence of adjoining sections 3A to 3D. The diffractive structure 3—and hence the optical element 1—has a profile height h, which is no more than 100 μm, in particular no more than 50 μm, and preferably no more than 20 μm. In a direction perpendicular to the profile height, the diffractive structure has a spatial variation in the refractive index, by means of which the sections 3A to 3D are defined. Within each section 3A to 3D, the refractive index increases continuously from a region 5 illustrated with a low dot density, which represents a region with a minimum refractive index $n_{min}(\lambda_0)$ in relation to a specific wavelength zo of the diffractive structure, to a region 7 illustrated with a high dot density, which represents a region with a maximum refractive index $n_{max}(\lambda_0)$ in relation to the specific wavelength $\lambda_0$. Such a diffractive structure is called a gradient index DOE or abbreviated GRIN DOE. Such a grating can be designed in such a way that its spectral diffraction efficiency $\eta(\lambda)$ theoretically attains a value of 1 or 100% for an intrinsic wavelength $\lambda_{des}$, the so-called design wavelength. In this case, the design wavelength $\lambda_{des}$ need not correspond to the specific wavelength $\lambda_0$ but a correspondence of specific wavelength $\lambda_0$ and design wavelength $\lambda_{des}$ can simplify the design of the diffractive structure if a high diffraction efficiency should be attained over the entire visible spectral range with, at the same time, a low profile height of the diffractive structure.

In the present exemplary embodiment, the continuous increase in the refractive index $n(\lambda_0)$ at the specific wavelength $\lambda_0$ is characterized by a linear increase from the minimum refractive index $n_{min}(\lambda_0)$ at the specific wavelength $\lambda_0$ present in the region 5 to the maximum refractive index $n_{max}(\lambda_0)$ at the specific wavelength $\lambda_0$ present in the region 7. The minimum refractive index $n_{min}(\lambda_0)$ and the maximum refractive index $n_{max}(\lambda_0)$ at the specific wavelength $\lambda_0$ of the diffractive structure 3 are chosen in such a way that light at the design wavelength $\lambda_{des}$ experiences a phase shift of j×2π in the case of a transmission through the region with the maximum refractive index $n_{max}(\lambda_0)$ in relation to a transmission through the region with the minimum refractive index $n_{min}(\lambda_0)$, where j represents the order of diffraction. In the present exemplary embodiments, j=1 is chosen such that the light is deflected into the first order of diffraction. However, it is also possible to choose j>1—and hence a higher order of diffraction—or j<0—and hence a negative order of diffraction. In the case of a negative order of diffraction, the maximum refractive index $n_{max}(\lambda_0)$ would be present in the region 5 and the minimum refractive index $n_{min}(\lambda_0)$ would be present in the region 7.

The minimum refractive index $n_{min}(\lambda_0)$ and the maximum refractive index $n_{max}(\lambda_0)$ at the specific wavelength $\lambda_0$ have such values that the maximum refractive index $n_{max}(\lambda_0)$ at the specific wavelength has a value that is higher than that of the minimum refractive index $n_{min}(\lambda_0)$ at the specific wavelength by at least 0.005, in particular at least 0.01, and preferably at least 0.015. If the specific wavelength $\lambda_0$ is the design wavelength $\lambda_{des}$ of the diffractive structure at the same time, the refractive index difference $\Delta n(\lambda_{des})=n_{max}(\lambda_{des})-n_{min}(\lambda_{des})$ between the maximum refractive index and the minimum refractive index determines the profile height h of the diffractive optical structure in accordance with the following equation (in the first order of diffraction):

$$h=\lambda_{des}/\Delta n(\lambda_{des})$$

In the j-th order of diffraction, the profile height h would be given accordingly by:

$$h=j\lambda_{des}/\Delta n(\lambda_{des}).$$

If the specific wavelength $\lambda_0$ deviates from the design wavelength $\lambda_{des}$ of the diffractive structure, the refractive indices $n_{max}(\lambda_0)$ and $n_{min}(\lambda_0)$ at the specific wavelength must initially be converted into the refractive indices $n_{max}(\lambda_{des})$ and $n_{min}(\lambda_{des})$ at the design wavelength $\lambda_{des}$ in order to be able to calculate the profile height of the diffractive structure.

In the present exemplary embodiment, the specific wavelength $\lambda_0$ equals the design wavelength $\lambda_{des}$ of the diffractive structure and has a value of 587.56 nm. Hence, it corresponds to the d-line of helium. However, in principle, any other wavelength can be used as the specific wavelength $\lambda_0$, for example the wavelength at the e-line of mercury (546.07 nm), provided said wavelength is located in the wavelength range for which there should be an efficiency achromatization of the diffractive structure. In the present embodiment, this wavelength range is the visible wavelength range, i.e., the wavelength range between 400 and 800 nm or, specified with slightly tighter boundaries, from 400 to 750 nm. Therefore, at 587.56 nm, the specific wavelength $\lambda_0$ is located more or less at the center of the visible wavelength range in the present exemplary embodiment.

To attain the efficiency achromatization of the diffractive structure 3 in the visible spectral range, the material from which it is produced has a maximum refractive index $n_{max}(\lambda_0)$ of 1.700 and a minimum refractive index $n_{min}(\lambda_0)$ of 1.695 in the present exemplary embodiment such that a refractive index difference $\Delta n(\lambda_0) = n_{max}(\lambda_0) - n_{min}(\lambda_0)$ of 0.005 is present. Moreover, the regions 7 with the maximum refractive index $n_{max}(\lambda_0)$ have an Abbe number $\nu_{max}$ of 50 and the regions 5 with the low refractive index $n_{min}(\lambda_0)$ have an Abbe number $\nu_{min}$ of 42, and so there is an Abbe number difference $\Delta\nu$ with a value of 8. These values originate from an optimization in which the value combination $(n_{max}(\lambda_0) = 1.7000; \nu_{max} = 50)$ was kept constant and the values for $n_{min}(\lambda_0)$ and for $\nu_{min}$, and hence the refractive index difference $\Delta n(\lambda_0)$ and the Abbe number difference $\Delta\nu$, were optimized in view of a high diffraction efficiency averaged over the visible spectral range. However, instead of fixing the values for $n_{max}(\lambda_0)$ and $\nu_{max}$, the values for $n_{min}(\lambda_0)$ and $\nu_{min}$ could alternatively be fixed. Moreover, there is also the option of optimizing the values for the maximum refractive index $n_{max}(\lambda_0)$, the minimum refractive index $n_{min}(\lambda_0)$, the Abbe number $\nu_{max}$ and the Abbe number $\nu_{min}$ in such a way that none of these values is fixed.

A variable which can be used to specify the level of the diffraction efficiency averaged over a spectral range—and hence the degree of efficiency achromatization of the diffractive structure—is the polychromatic integral diffraction efficiency $\eta_{PIDE}$ (PIDE: polychromatic integral diffraction efficiency), which is a spectral diffraction efficiency $\eta(\lambda)$ averaged over a specific spectral range—over the visible spectral range in the present embodiment—and which can be calculated according to the equation:

$$\eta_{PIDE} = \frac{1}{0.8\ \mu m - 0.4\ \mu m} \int_{0.4\ \mu m}^{0.8\ \mu m} \eta(\lambda)$$

where the spectral diffraction efficiency $\eta(\lambda)$ is given by the equation:

$$\eta(\lambda) = \operatorname{sinc}^2\left(\frac{h \Delta n(\lambda)}{\lambda} - 1\right)$$

provided shadowing effects can be neglected. In the j-th order of diffraction, the "−1" would need to be replaced by "−j". Here, sinc represents the sinc function, h represents the profile height of the diffractive structure, $\Delta n(\lambda) = n_1(\lambda) - n_2(\lambda)$ represents the wavelength-dependent refractive index difference and $\lambda$ represents the wavelength, where $n_1(\lambda_0) = n_{max}(\lambda_0)$ and $n_2(\lambda_0) = n_{min}(\lambda_0)$ apply.

The wavelength-dependent curve of the refractive index $n(\lambda)$ can be approximated very well with the aid of the Abbe number and the part partial dispersion by way of the Cauchy equation $$n(\lambda) = a + \frac{b}{\lambda^2} + \frac{c}{\lambda^4} + O(\lambda^{-6}),$$

particularly in the visible spectral range. Here, the coefficients a, b, and c can be expressed according to $$a = n_d - \frac{b}{\lambda_d^2} - \frac{c}{\lambda_d^4}$$

and $$\begin{pmatrix} b \\ c \end{pmatrix} = \frac{1}{\lambda_{F,C}^2 \lambda_{g,F}^4 - \lambda_{F,C}^4 \lambda_{g,F}^2} \begin{pmatrix} \lambda_{g,F}^4 & -\lambda_{F,C}^4 \\ -\lambda_{g,F}^2 & \lambda_{F,C}^2 \end{pmatrix} \begin{pmatrix} \frac{n_d - 1}{\nu_d} \\ \frac{n_d - 1}{\nu_d} P_{g,F} \end{pmatrix}$$

with $$\lambda_{g,F}^2 = \frac{1}{\lambda_g^2} - \frac{1}{\lambda_F^2}$$

$$\lambda_{F,C}^2 = \frac{1}{\lambda_F^2} - \frac{1}{\lambda_C^2}$$

$$\lambda_{g,F}^4 = \frac{1}{\lambda_g^4} - \frac{1}{\lambda_F^4}$$

$$\lambda_{F,C}^4 = \frac{1}{\lambda_F^4} - \frac{1}{\lambda_C^4}$$

by way of the refractive index $n_d$ at the d-line of helium (587.56 nm), the Abbe number $\nu_d$, and the part partial dispersion $P_{g,F}$.

The Abbe number is a dimensionless variable which describes the dispersive properties of an optical material. In the present embodiment, the following definition of the Abbe number is used:

$$\nu_d = \frac{n_d - 1}{n_F - n_C},$$

where the subscript "d" means that the d-line of helium is used to define the Abbe number. In this definition, $n_d$ represents the refractive index at the wavelength of the d-line of helium (587.56 nm), $n_F$ represents the refractive index at the wavelength of the F-line of hydrogen (486.13 nm) and $n_C$ represents the refractive index at the wavelength of the C-line of hydrogen (656.27 nm). However, other definitions of the Abbe number than $\nu_d$ can likewise find use within the scope of the present invention, for example $\nu_e$. In the case of $\nu_e$, the refractive index $n_d$ at the wavelength of the d-line of helium is replaced by the refractive index $n_e$ at the wavelength of the e-line of mercury (546.07 nm), the refractive index $n_F$ at the wavelength of the F-line of hydrogen is replaced by the refractive index $n_{F'}$ at the wavelength of the F'-line of cadmium (479.99 nm) and the refractive index $n_C$ at the wavelength of the C-line of hydrogen is replaced by the refractive index $n_{C'}$ at the wavelength of the C'-line of cadmium (643.85 nm). Since the present invention does not depend on the chosen definition of the Abbe number, the latter is only denoted by $\nu$ without an index in the present description. In the case of a different spectral range to the visible spectral range, refractive indices at other wavelengths should be chosen in place of the refractive indices at the above-described wavelengths, which other wavelengths are located within the spectral range for which the efficiency achromatization should be implemented. Therefore, none of the selected wavelengths need correspond to the design wavelength of the diffractive structure.

The part partial dispersion describes a difference between the refractive indices of two specific wavelengths in relation to a reference wavelength interval and represents a measure for the strength of the dispersion in the spectral range between these two wavelengths. In the present embodiment, the two wavelengths are the wavelength of the g-line of mercury (435.83 nm) and the wavelength of the F-line of hydrogen (486.13 nm), and so the part partial dispersion $P_{g,F}$ in the present embodiment is given by:

$$P_{g,F} = \frac{n_g - n_F}{n_F - n_C}$$

where $n_F$ and $n_C$ are the same as in the case of $v_d$. The part partial dispersion can also use a different definition, in which, for example, the F-line and C-line of hydrogen have been replaced by the F'-line and C'-line of cadmium.

The refractive index $n_d$ at the wavelength of the d-line of helium, which is directly incorporated in the coefficients of the Cauchy equation, can likewise be replaced by a refractive index at a different wavelength provided the other wavelength is located within the spectral range for which the efficiency achromatization should be implemented. However, the equations for the coefficients a, b, and c would have to be matched to the refractive index at the other wavelength.

The above-described optimization can be implemented therewith in view of attaining a specified minimum of the polychromatic integral diffraction efficiency $\eta_{PIDE}$ or in view of attaining a maximum of the polychromatic integral diffraction efficiency $\eta_{PIDE}$. Here, it is found that the influence of the part partial dispersion $P_{g,F}$ on the polychromatic integral diffraction efficiency $\eta_{PIDE}$ is significantly lower than the influence of the Abbe number v, and so a value of 0.95 or higher can be obtained for the polychromatic integral diffraction efficiency $\eta_{PIDE}$ for a broad value range of the part partial dispersion $P_{g,F}$ with the aid of an optimization of $\Delta n(\lambda_0)$ and $\Delta v$, or an optimization of $n_{max}(\lambda_0)$, $n_{min}(\lambda_0)$, $v_{max}$, and $v_{min}$. However, in principle, there is also the option of ascertaining optimized values for $n_{max}(\lambda_0)$, $n_{min}(\lambda_0)$, $v_{max}$, $v_{min}$, $P_{g,F,1}$, and $P_{g,F,2}$ instead of optimized values for $n_{max}(\lambda_0)$, $n_{min}(\lambda_0)$, $v_{max}$, and $v_{min}$ or optimized values for $\Delta n(\lambda_0)$ and $\Delta v$, where $P_{g,F,1}$ is assigned to $n_{max}(\lambda_0)$ and $v_{max}$ and $P_{g,F,2}$ s assigned to $n_{min}(\lambda_0)$ and $v_{min}$. If only $n_{max}(\lambda_0)$, $n_{min}(\lambda_0)$, $v_{max}$, and $v_{min}$ or $\Delta n(\lambda_0)$ and $\Delta v$ are optimized, then two maxima are obtained in the spectral diffraction efficiency $\eta(\lambda)$. If moreover $P_{g,F,1}$ and $P_{g,F,2}$ are likewise obtained, then three maxima are obtained in the spectral diffraction efficiency $\eta(\lambda)$ provided the difference of $P_{g,F,1}$ and $P_{g,F,2}$ becomes sufficiently large, i.e., $P_{g,F,1}$ becomes sufficiently large and $P_{g,F,2}$ becomes sufficiently small.

Figure 2:
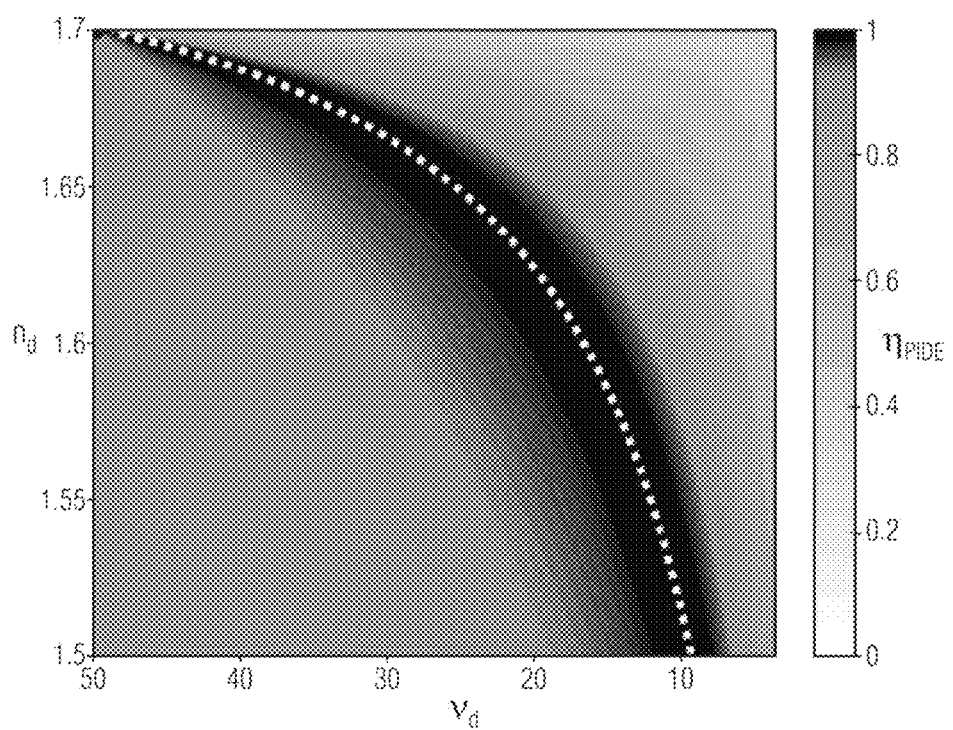
FIG. 2 shows, for a maximum refractive index of 1.7 and a maximum Abbe number of 50, a diagram with the aid of which suitable combinations of minimum refractive index and minimum Abbe number can be presented.

FIG. 2 shows, for a combination of a given maximum refractive index $n_{max}(\lambda_0)$ at $\lambda_0=587.56$ nm with a value of 1.700 and a given maximum Abbe number $v_{max}$ with a value of 50, the polychromatic integral diffraction efficiency $\eta_{PIDE}$ as a function of the minimum refractive index $n_{min}(\lambda_0)$ and the minimum Abbe number $v_{min}$ in the form of grayscale values. In the calculation on which the illustration of FIG. 2 is based, the part partial dispersions $P_{g,F,1}$ and $P_{g,F,2}$ were kept constant. The polychromatic integral diffraction efficiency $\eta_{PIDE}$ has its maximum value along a curve $n_{min}$ ($v_{min}$). This curve is plotted in FIG. 2 using dashed lines. Surprisingly, the maximum value of the polychromatic integral diffraction efficiency $\eta_{PIDE}$ on this curve lies virtually at 1 and still attains values of 0.95 or more within a region around this curve. The further a point ($v_{min}$, $n_{min}$) is away from the curve, the lower the polychromatic integral diffraction efficiency $\eta_{PIDE}$. With the aforementioned values of $n_{max}(\lambda_0)=1.700$, $n_{min}(\lambda_0)=1.695$, $v_{max}=50$ and $v_{min}=42$, a polychromatic integral diffraction efficiency $\eta_{PIDE}$ of at least 0.95 is attained, as can be read from the illustration in FIG. 2.

With a refractive index difference $\Delta n(\lambda_0)$ of 0.005, as present in the embodiment described, a profile height h of 117.5 μm arises. Lower profile heights can be realized with greater values for the refractive index difference $\Delta n(\lambda_0)$. FIG. 2 shows that, in addition to the described combination of refractive index difference $\Delta n(\lambda_0)$ and Abbe number difference $\Delta v$, a multiplicity of further combinations of refractive index difference $\Delta n(\lambda_0)$ and Abbe number difference $\Delta v$ are available, by means of which it is possible to attain a polychromatic integral diffraction efficiency $\eta_{PIDE}$ with a value of at least 0.95. By way of example, if the minimum refractive index $n_{min}(\lambda_0)$ has a value of 1.650 instead of 1.695 and the refractive index difference $\Delta n(\lambda_0)$ consequently has a value of 0.05 instead of 0.005, the profile height h merely needs to be 11.75 μm. In this case, the Abbe number $v_{min}$ should range between approximately 18 and approximately 30 in order to attain a polychromatic integral diffraction efficiency $\eta_{PIDE}$ of at least 0.95. The highest polychromatic integral diffraction efficiency $\eta_{PIDE}$ is attained for $n_{min}(\lambda_0)=1.650$ at an Abbe number $v_{min}$ of approximately 25, i.e., for an Abbe number difference $\Delta v$ of approximately 25. Within the scope of the above-described optimization, a maximum profile height h can be specified as a boundary condition in order to prevent the optimization result from leading to an unwanted high profile height. The optimization of $\Delta n(\lambda_0)$ and $\Delta v$, or of $n_{max}(\lambda_0)$, $n_{min}(\lambda_0)$, $v_{max}$, and $v_{min}$, or $n_{max}(\lambda_0)$, $n_{min}(\lambda_0)$, $v_{max}$, $v_{min}$, $P_{g,F,1}$, and $P_{g,F,2}$ can also be carried out in such a way that both the polychromatic integral diffraction efficiency $\eta_{PIDE}$ is maximized and the profile height h is minimized. Instead of an optimization in view of maximizing the polychromatic integral diffraction efficiency $\eta_{PIDE}$ and/or the profile height h, or in addition to such an optimization, there can also be an optimization in view of attaining a specified minimum value for the polychromatic integral diffraction efficiency $\eta_{PIDE}$ and/or an optimization in view of dropping below a specified maximum value for the profile height h.

Figure 3:
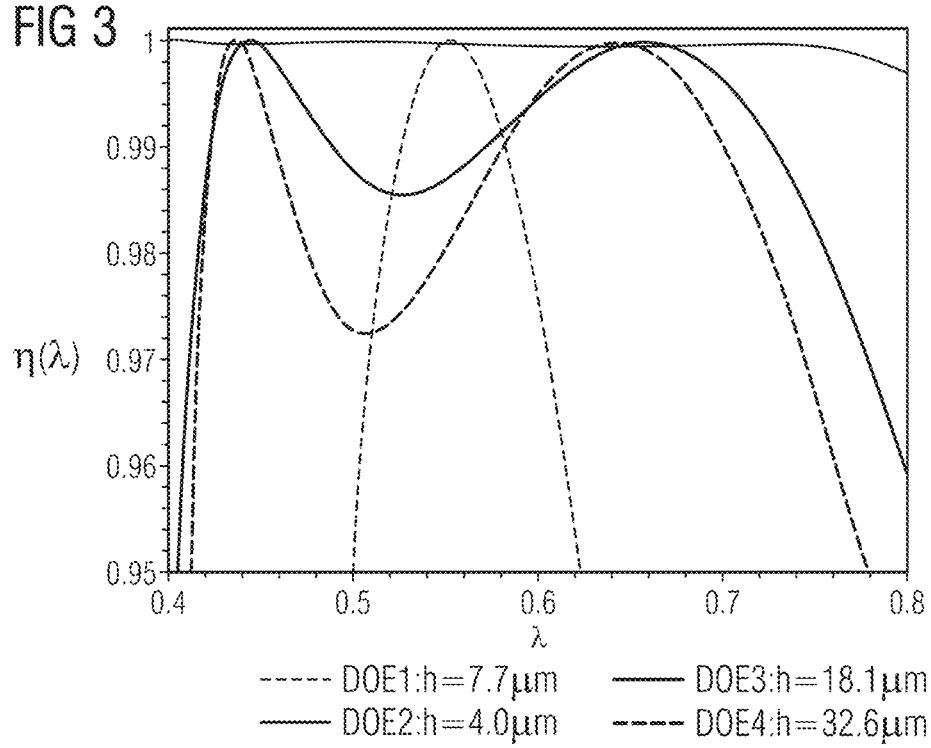
FIG. 3 shows the spectral diffraction efficiency of different diffractive optical elements as a function of wavelength.
Figure 4:
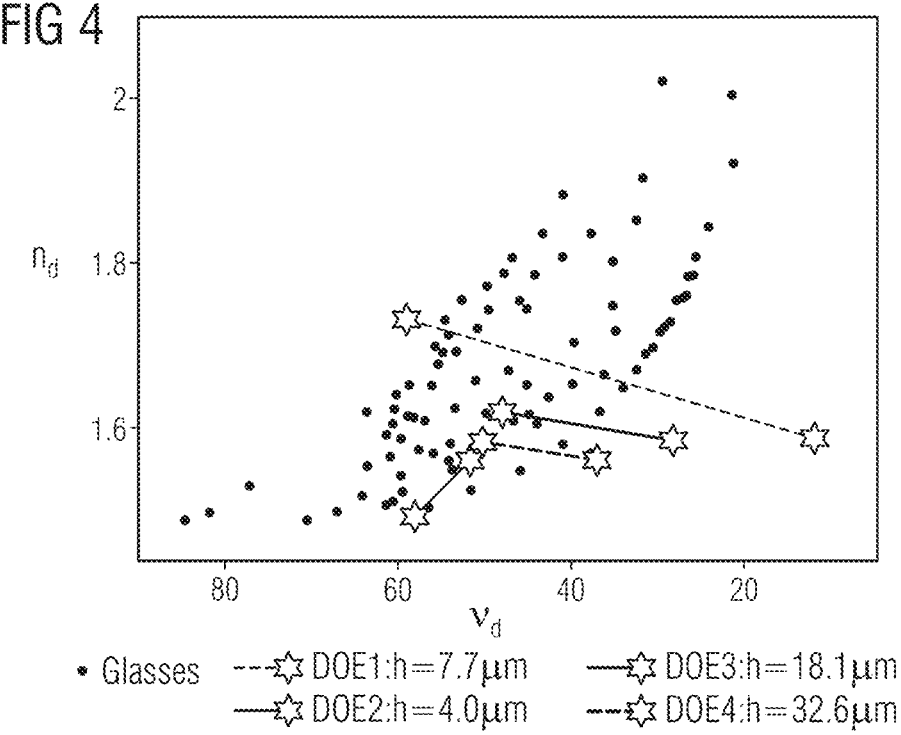
FIG. 4 shows the respective combinations of maximum refractive index, minimum refractive index, high Abbe number, and low Abbe number of the diffractive optical elements of FIG. 3.

Examples of the curve of the spectral diffraction efficiency $\eta(\lambda)$ of optimized diffractive structures in the visible spectral range are illustrated in FIG. 3 and FIG. 4 for a number of diffractive structures with different refractive index differences $\Delta n(\lambda_0)$ and Abbe number differences $\Delta v$. In this case, the specific wavelength $\lambda_0$ is the wavelength of the d-line of helium in each case, i.e. $\lambda_0=587.56$ nm applies.

FIG. 3 shows the spectral diffraction efficiency $\eta(\lambda)$ for four different diffractive optical elements which differ from one another in terms of their diffractive structures. The diffractive optical element labeled DOE1 is a one-layer comparison element, which has not been optimized in accordance with the present invention. The diffractive optical elements labeled DOE2 to DOE4 represent examples of diffractive optical elements which were optimized as per the present invention.

The diffractive optical element labeled DOE1 in FIG. 3 has a profile height h of 7.70 μm, a design wavelength $\lambda_0$ of 553 nm and a refractive index difference $\Delta n(\lambda_0)$ of 0.08. As can be gathered from FIG. 4, the low refractive index is at approximately 1.5 and the high refractive index is at just below 1.6. Here, the Abbe number assigned to the low refractive index, with a value of nearly 60, is approximately 10 higher than the Abbe number assigned to the high refractive index, which has a value of approximately 50. It is evident that the spectral diffraction efficiency $\eta(\lambda)$ drops steeply even at small distances from the design wavelength, and so a polychromatic integral diffraction efficiency $\eta_{PIDE}$ of at least 0.95 cannot be attained in the visible spectral range.

The diffractive optical element DOE2 according to the invention has a profile height of 4.0 μm, a design wavelength of 503 nm and a refractive index difference $\Delta n(\lambda_0)$ of approximately 0.15, with the minimum refractive index $n_{min}(\lambda_0)$ being just below 1.6 and the maximum refractive index $n_{min}(\lambda_0)$ being just above 1.7.

As is evident from FIG. 4, the Abbe number of the diffractive optical element DOE2 has a value of approximately 60 in the regions of the diffractive structure 3 with the high refractive index, while it has a value of approximately 10 in the regions of the diffractive structure 3 with the low refractive index, and so the Abbe number difference $\Delta v$ has a value of approximately 50. Hence, as is evident from FIG. 3, a very high spectral diffraction efficiency $\eta(\lambda)$ of approximately 1 is attained over the entire visible wavelength range in the case of a very low profile height of only 4.0 μm. With the curve of the spectral diffraction efficiency $\eta(\lambda)$ illustrated in FIG. 3, it is also possible to attain a polychromatic integral diffraction efficiency $\eta_{PIDE}$ with a value of virtually 1.

The diffractive optical element DOE3, likewise configured according to the invention, has a profile height of 18.1 μm, a design wavelength of 445 nm and a refractive index difference with a value of approximately 0.03, the maximum refractive index having a value just above 1.6 and the minimum refractive index having a value just below 1.6. In the regions of the diffractive structure 3 with the high diffractive index, the diffractive optical element DOE3 has an Abbe number of approximately 50 whereas it has an Abbe number with a value of approximately 25 in the regions of the diffractive structure 3 with the low refractive index. Therefore, the Abbe number difference $\Delta v$ has a value of approximately 25 in the case of the diffractive optical element DOE3. Although the diffractive structure 3 of the diffractive optical element DOE3 in the case of this combination of refractive index difference $\Delta n(\lambda_0)$ and Abbe number difference $\Delta v$ does not have a spectral diffraction efficiency $\eta(\lambda)$ that is quite as uniform as that of the diffractive optical element DOE2, the spectral diffraction efficiency $\eta(\lambda)$ nevertheless is above 0.97 nearly in the entire visible spectral range. Therefore, the diffractive optical element DOE3 has a high polychromatic integral diffraction efficiency $\eta_{PIDE}$ with a value of more than 0.95.

The fourth diffractive optical element DOE4 illustrated in FIG. 3 has a profile height of 32.6 μm, a design wavelength of 437 nm and a refractive index difference $\Delta n(\lambda_0)$ of approximately 0.015, with the low refractive index being located in the vicinity of 1.56 and the high refractive index being located in the vicinity of 1.58. The Abbe number in the regions 7 of the diffractive structure 3 with the high refractive index has approximately a value of 55 and the Abbe number in the regions 5 of the diffractive structure 3 with the low refractive index has approximately a value of 35 such that the Abbe number difference has approximately a value of 20 in the diffractive optical element DOE4. The spectral diffraction efficiency $\eta(\lambda)$ of the diffractive optical element DOE4 has an even more irregular profile than that of the diffractive optical element DOE3; nevertheless, the spectral diffraction efficiency $\eta(\lambda)$ is above 0.97 in a large part of the visible spectral range even in the case of this diffractive optical element. Therefore, the diffractive optical element DOE3 also has a high polychromatic integral diffraction efficiency $\eta_{PIDE}$ with a value of more than 0.95.

The comparison of the spectral diffraction efficiency $\eta(\lambda)$ of the conventional diffractive optical element DOE1 with the spectral diffraction efficiency $\eta(\lambda)$ of the diffractive optical elements DOE2 to DOE4 according to the invention shows that, with the aid of the optimization of a diffractive optical element according to the invention, the spectral diffraction efficiency $\eta(\lambda)$ can be high in the entire visible spectral range and can also be designed to be very uniform in comparison with the diffractive optical element DOE1. In the illustrated examples DOE2 to DOE4, this is attained by virtue of the spectral diffraction efficiency $\eta(\lambda)$ having a plurality of maxima in comparison with the conventional diffractive optical element DOE1. The diffractive optical element DOE2 has three maxima in the spectral diffraction efficiency $\eta(\lambda)$, which are located at approximately 725 nm and approximately 400 nm, in addition to 486.13 nm. The diffractive optical element DOE3 has two maxima in the spectral diffraction efficiency $\eta(\lambda)$, one at 656.27 nm and one at approximately 445 nm. The diffractive optical element DOE4 likewise has two maxima in the spectral diffraction efficiency $\eta(\lambda)$, one at 643.45 nm and one at approximately 437 nm. The spectral diffraction efficiency $\eta(\lambda)$ is reduced between the minima, with the reduction being ever smaller, the greater the refractive index difference and hence the smaller the profile height h of the diffractive structure 3 of the diffractive optical element.

As can be gathered from the examples DOE2 to DOE4, the Abbe number difference should be chosen to be ever greater, the greater the refractive index difference. Since an increase in the refractive index difference leads to a reduction in the profile height and, accompanying this, to a reduction of shadowing effects, large refractive index differences $\Delta n(\lambda_0)$ in conjunction with large Abbe number differences $\lambda v$ are advantageous. The combinations of refractive index difference and Abbe number difference of the diffractive optical elements DOE2 to DOE4 are respectively located in a narrow region around the line of maximum polychromatic integral diffraction efficiency $\eta_{PIDE}$, which is illustrated using the dashed line in FIG. 2.

A second exemplary embodiment of a diffractive optical element 10 according to the invention is illustrated in FIG. 5. In contrast to the diffractive optical element 1 of FIG. 1, in which the variation in the refractive index realizes a periodic diffractive structure 3 with an unchanging width of its sections 3A to 3D, the diffractive structure 13 in the diffractive optical element 10 of the second exemplary embodiment has such a variation that two horizontally mirrored diffractive structures 13, 13' adjoin one another at the center of the diffractive structure 13. With increasing distance from the center of the diffractive structure 13, there is a reduction in the lateral dimensions of the sections 13A to 13D, and 13A' to 13D', in which the refractive indices respectively vary from the minimum refractive index $n_{min}(\lambda_0)$ to the maximum refractive index $n_{max}(\lambda_0)$. As a result, it is possible to design the diffractive optical element 10 as a diffraction lens, for example, with the manner in which the lateral dimensions reduce with increasing distance from the center of the diffractive structure 13 depending, inter alia, on what focal position is intended to be obtained.

Like in the first exemplary embodiment, the minimum refractive index $n_{min}(\lambda_0)$ and the maximum refractive index $n_{max}(\lambda_0)$ at the design wavelength $\lambda_{des}$ of the diffractive structure 13 are chosen in such a way that light at the design wavelength $\lambda_{des}$ experiences a phase shift of $j \times 2\pi$, where j represents the order of diffraction, in the case of a transmission through the region with the maximum refractive index $n_{max}((\lambda_0)$ in relation to a transmission through the region with the minimum refractive index $n_{min}(\lambda_0)$. For sections 13D, 13D' with a small width, this means that the curve of the refractive index from the region 7D, 7D' with the maximum refractive index $n_{max}(\lambda_0)$ to the region 5D, 5D' with the minimum refractive index $n_{min}(\lambda_0)$ must be steeper than, for example, in the case of the sections 13B, 13B' with a greater width.

By way of example, a diffractive optical element 10 as illustrated in FIG. 5 can be integrated into a lens 15 as illustrated schematically in FIG. 6 in order thereby to create focal points based on the diffraction by the diffractive optical element 10 in addition to the focal point based on the refraction of the lens 15. By way of example, this is of interest in the case of intraocular lenses since this can create intraocular lenses with a plurality of focal points, which would allow the wearer of the intraocular lens to have sharp vision at different distances using the same lens. Moreover, refraction and diffraction have different wavelength dependencies. Therefore, the diffractive optical element can be embodied in such a way that its wavelength dependence compensates the refractive wavelength dependence of the lens and thus corrects the chromatic aberration of the lens.

Figure 8:
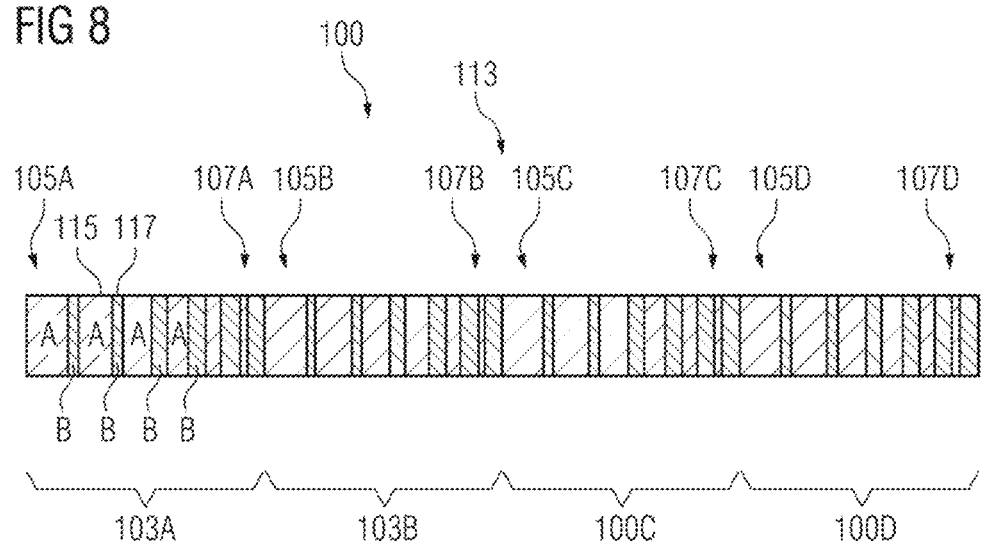
FIG. 8 shows a third exemplary embodiment of a diffractive optical element.

A third exemplary embodiment of a diffractive optical element 100 according to the invention is illustrated in FIG. 8. In contrast to the diffractive optical elements of the first exemplary embodiment and of the second exemplary embodiment, the refractive index within the sections 103A, 103B, 103C, 103D of the diffractive structure 113 does not increase continuously from the minimum refractive index $n_{min}(\lambda_0)$ to the maximum refractive index $n_{max}(\lambda_0)$ at the design wavelength $\lambda_{des}$. Instead, each of the sections 103A, 103B, 103C, 103D has a number of first regions 115 of a first material A with a first refractive index $n_a(\lambda_0)$ and a number of second regions 117 of a second material B with a second refractive index $n_b(\lambda_0)$, with the first regions 115 and the second regions 117 alternating in the section. In this case, the second refractive index $n_b(\lambda_0)$ is higher than the first refractive index $n_a(\lambda_0)$. At least in the direction of the extent of the diffractive structure in which the sections 103A, 103B, 103C, 103D follow one another, the maximum width of the individual regions 115, 117 is less than the mean wavelength of the wavelength range for which there should be an efficiency achromatization of the diffractive structure. Such a structure forms a so-called metasurface.

In the present exemplary embodiment, the wavelength range for which there should be an efficiency achromatization of the diffractive structure is the visible wavelength range, i.e., the wavelength range from 400 to 800 nm or, specified with slightly tighter boundaries, from 400 to 750 nm, and the maximum width $B_{max}$ of the regions 115, 117 is 100 nm. It is therefore less than 0.3-times the mean wavelength of the visible wavelength range and even less than 0.3-times the smallest wavelength of the visible wavelength range. For the regions 115, the maximum width $B_{max}$ is respectively attained at the ends 105A, 105B, 105C, 105D of the sections 103A, 103B, 103C, 103D, whereas it is respectively attained at the ends 107A, 107B, 107C, 107D of the sections 103A, 103B, 103C, 103D for the regions 117. Since the maximum width $B_{max}$ of the regions 115, 117 is less than the mean wavelength, volume elements with an edge length corresponding to the wavelength, i.e., an edge length of 400 to 800 nm in the present case, act like a homogeneous region with an effective refractive index $n_{eff}(\lambda_0)$ in the sections 103A, 103B, 103C, 103D. In this case, the effective refractive index $n_{eff}(\lambda_0)$ emerges from the refractive index $n_a(\lambda_0)$ of the first regions 115, the refractive index $n_b(\lambda_0)$ of the second regions 117, and the volume ratio of the first and second regions 115, 117 within such a volume element. The phase shift required for the diffraction can then be brought about by varying the effective refractive index $n_{eff}(\lambda_0)$ as a function of location within the respective sections 103A, 103B, 103C, 103D. Here, the variation of the effective refractive index $n_{eff}(\lambda_0)$ within a section 103A, 103B, 103C, 103D can be realized by varying the width of the first regions 115 and/or the width of the second regions 117 as a function of the location within the section 103A to 103D and hence by varying the volume components of the first material A and the second material B. What can be attained thereby is that the effective refractive index $n_{eff}(\lambda_0)$ as a function of location within the respective section 103A, 103B, 103C, 103D varies between a minimum effective refractive index $n_{eff,min}(\lambda_0)$ at the ends 105A, 105B, 105C, 105D and a maximum effective refractive index $n_{eff,max}(\lambda_0)$ at the ends 107A, 107B, 107C, 107D. For the purposes of an efficiency achromatization, there can then be an optimization of the minimum effective refractive index $n_{eff,min}(\lambda_0)$ and the maximum effective refractive index $n_{eff,max}(\lambda_0)$, as has been explained above for the minimum refractive index $n_{min}(\lambda_0)$ and the maximum refractive index $n_{max}(\lambda_0)$ of a gradient index DOE. In the case of the metasurface, the ascertained refractive indices can be realized by means of a suitable choice of the first material A and the second material B and/or by means of suitable dimensions of the first regions 115 and the second regions 117.

In a development of the third exemplary embodiment, the maximum width $B_{max}$ of the regions 115, 117 is not less than 0.3-times the mean wavelength of the wavelength range of 400 and 800 nm. Instead, the maximum width $B_{max}$ of at least the regions with the higher refractive index, i.e., the maximum width of the second regions 117 with the refractive index $n_b$ in the present exemplary embodiment, lies between 0.3-times the mean wavelength of the wavelength range for which there should be an efficiency achromatization of the diffractive structure and 1.0-times the mean wavelength of the wavelength range for which there should be an efficiency achromatization of the diffractive structure. As a result, the second regions 117 act like waveguides where they attain their maximum width $B_{max}$, which can lead to reduction of shadowing effects in comparison with a gradient index DOE. This applies, in particular, to the case of large angles of incidence or small widths of the sections, as has been shown, for example, by P. Lalanne in "Waveguiding in blazed-binary diffractive elements", J. Opt. Soc. Am. A 16 (1999). In this case, the refractive index $n_b$ of the second region 117 that forms the waveguide depends on both the geometry of the regions 117 with the higher refractive index and the refractive index of the surrounding medium, i.e., the refractive index $n_a$ of the first regions 115 in the present exemplary embodiment. A corresponding statement also applies to the Abbe number and the part partial dispersion.

Figure 9:
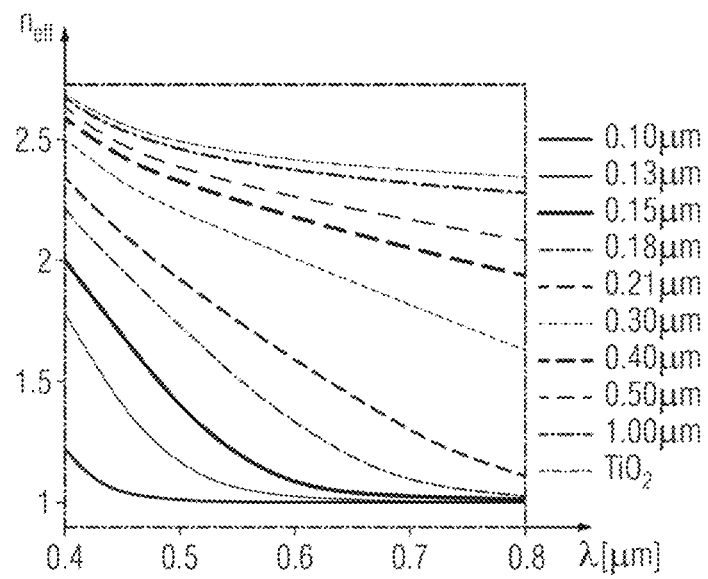
FIG. 9 shows the dependence of the refractive index of a cylindrical waveguide on its diameter.

FIG. 9 shows the wavelength dependence of the refractive index of a large body made of titanium dioxide (TiO$_2$) in comparison with the refractive indices of the fundamental mode of a cylindrical waveguide consisting of titanium dioxide (TiO$_2$) with diameters ranging from 100 nm to 1000 nm. The figure shows that as the diameters of the waveguides become smaller, the wavelength-dependent refractive index deviates ever more pronouncedly from the wavelength-dependent refractive index of the large body made of titanium dioxide.

Figure 10:
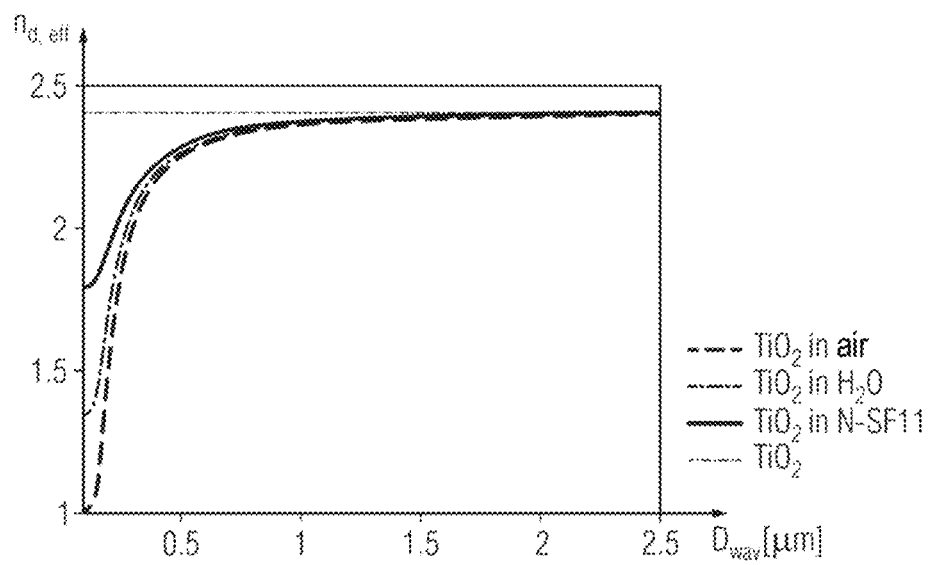
FIG. 10 shows the dependence of the refractive index of the waveguide of FIG. 9 on the ambient medium.
Figure 11:
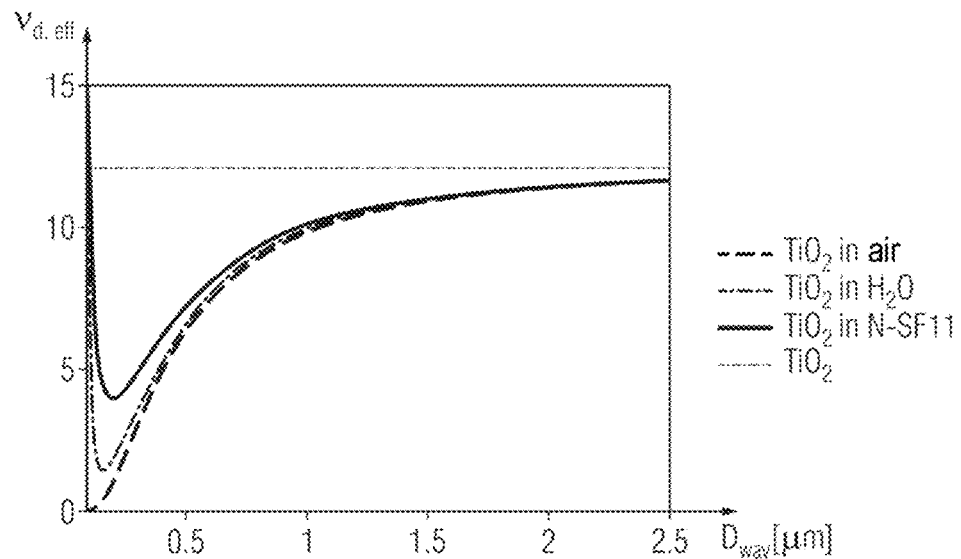
FIG. 11 shows the dependence of the Abbe number of the waveguide of FIG. 9 on the ambient medium.
Figure 12:
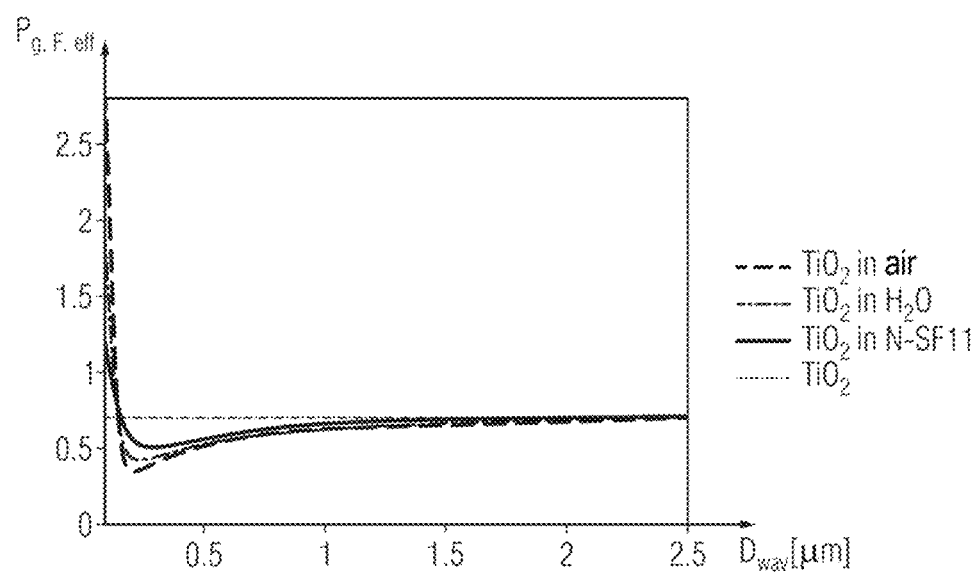
FIG. 12 shows the dependence of the part partial dispersion of the waveguide of FIG. 9 on the ambient medium.

FIGS. 10, 11, and 12 show the dependence of the refractive index (FIG. 10), the Abbe number (FIG. 11), and the part partial dispersion (FIG. 12) of the fundamental mode of a cylindrical waveguide consisting of titanium dioxide (TiO$_2$) at the d-line of helium (wavelength: 587.56 nm), as a function of the diameter $D_{wav}$ of the waveguide for different materials surrounding the waveguide. The materials surrounding the waveguide are alternatively air, water (refractive index $n_d$: 1.33; Abbe number $v_d$: 55.8; part partial dispersion $P_{g,F}$: 0.51), and the glass material N-SF11 which is commercially distributed by Schott as N-SF11 (refractive index $n_d$: 1.78, Abbe number $v_d$: 25.8; part partial dispersion $P_{g,F}$: 0.61) in this case. For comparison purposes, the figures moreover plot the refractive index of a large body made of titanium dioxide (TiO$_2$). It is evident from the figures that there is a significant dependence of the refractive index, the Abbe number, and the part partial dispersion on the surrounding material, particularly in the case of small diameters $D_{wav}$ of the waveguide.

Figure 13:
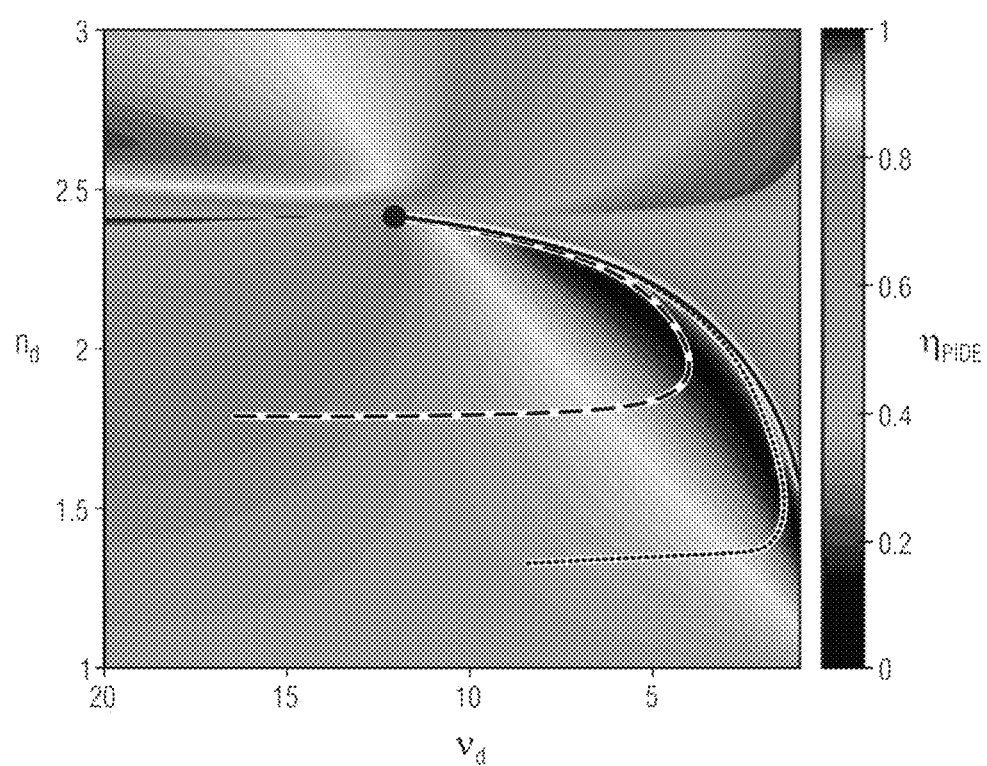
FIG. 13 shows, for the visible wavelength range, the polychromatic integral diffraction efficiency of a diffractive structure, for which the refractive index of $TiO_2$ for $n_{max}(\lambda_0)$ was chosen, as a function of $n_d$ and $v_d$.

FIG. 13 shows the polychromatic integral diffraction efficiency $\eta_{PIDE}$ for the visible wavelength range for a diffractive structure for which the refractive index of TiO$_2$ was chosen for $n_{max}(\lambda_0)$, as a function of $n_d$ and $v_d$. The solid line in FIG. 13 shows the combinations of $n_d$ and $v_d$ which arise from varying the diameter $D_{wav}$ between 0 and 2500 nm for cylindrical waveguides made of TiO$_2$ and surrounded by air. The figure shows that a polychromatic integral diffraction efficiency $\eta_{PIDE}$ of at least 0.95 cannot be attained in the visible wavelength range for cylindrical waveguides made of TiO$_2$ and surrounded by air.

The dotted line shows the combinations of $n_d$ and $v_d$ that arise from varying the diameter $D_{wav}$ between 0 and 2500 nm for cylindrical waveguides made of TiO$_2$ and surrounded by water. It is evident that a very high polychromatic integral diffraction efficiency $\eta_{PIDE}$ can be attained in the region around $n_d$=1.5 and $v_d$=1.5. The values $n_d$=1.5 and $v_d$=1.5 can be attained with a diameter $D_{wav}$ of the cylindrical waveguides of approximately 80 nm, as can be read from FIGS. 10 and 11. This diameter corresponds to approximately 0.13 times 600 nm, i.e., 0.13-times the mean wavelength of the visible wavelength range and 0.2 times 400 nm, i.e. 0.2-times the smallest wavelength of the visible wavelength range. Thus, a suitable effective minimum refractive index $n_{eff,min}(\lambda_0)$ for a metasurface can be found by optimizing $n_d$ and $v_d$ in the case of the material combination of TiO$_2$ and water, but the waveguide effect does not occur here.

The dashed line shows the combinations of $n_d$ and $v_d$ that arise from varying the diameter $D_{wav}$ between 0 and 2500 nm for cylindrical waveguides made of TiO$_2$ and surrounded by N-SF11. It is evident that a very high polychromatic integral diffraction efficiency $\eta_{PIDE}$ can be attained in the region around $n_d$=2 and $v_d$=4.2. The values $n_d$=2 and $v_d$=4.2 can be attained with a diameter $D_{wav}$ of the cylindrical waveguides of approximately 280 nm, as can be read from FIGS. 10 and 11. This diameter corresponds to approximately 0.7 times 400 nm, 0.46 times 600 nm, and 0.35 times 800 nm, i.e., 0.7-times the shortest wavelength, 0.46-times the mean wavelength, and 0.35-times the longest wavelength of the visible wavelength range. This case corresponds to the modified third exemplary embodiment, i.e., a metasurface with waveguide effect.

Thus, the optimization of $n_{eff,min}(\lambda_0)$ and $n_{eff,max}(\lambda_0)$ can be achieved by different approaches: firstly, it is possible to adapt the materials that surround the individual waveguides. Secondly, the material of the waveguides itself can be adapted. Finally, it is also possible to optimize the geometry of the waveguides, with, however, this requiring more complex geometries than a cylinder.

Figure 7:
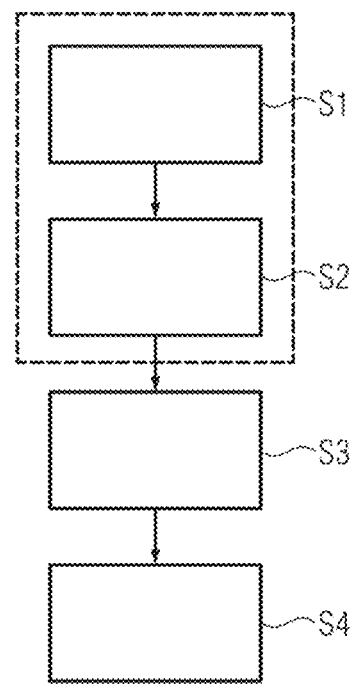
FIG. 7 shows a method for producing a diffractive optical element on the basis of a flowchart.

The production of an efficiency-achromatized diffractive optical element according to the invention is described below with reference to FIG. 7. The figure shows a flowchart of the production process which, in the present embodiment, comprises in steps S1 and S2 a method for designing the diffractive structure for the diffractive optical element. The steps of the method for producing an efficiency-achromatized diffractive optical element according to the invention which relate to the design of the diffractive structure are surrounded by the dashed line in FIG. 7. Thus, in the exemplary embodiment present, the specific production of the diffractive optical element is preceded by a method for designing its diffractive structure. However, it is also possible to separate the production of the diffractive optical element from the design of the diffractive structure, for example if a catalog of diffractive structures has been designed in advance, from which a diffractive structure is selected for the purposes of producing the diffractive optical element.

In the present embodiment, the production process of the diffractive optical element starts with the first step S1 of designing the diffractive optical structure. In step S1, a polychromatic integral diffraction efficiency $\eta_{PIDE\_target}$ to be obtained for all wavelengths of a spectral range extending over at least 300 nm and preferably over at least 350 nm is specified. Here, the polychromatic integral diffraction efficiency $\eta_{PIDE\_target}$ to be obtained typically has at least a value of 0.95. Optionally, a maximum profile height $h_{max}$ of the diffractive structure can additionally also be specified in step S1.

Once the value $\eta_{PIDE\_target}$ for the polychromatic integral diffraction efficiency to be obtained has been specified in step S1, the values for $n_{max}(\lambda_0)$, $n_{min}(\lambda_0)$, $v_{max}$, $v_{min}$, $P_{g,F,1}$, and $P_{g,F,2}$ are varied in step S2 of the exemplary embodiment for the purposes of optimizing the polychromatic integral diffraction efficiency $\eta_{PIDE}$ until the error function $\Delta\eta_{PIDE} = \eta_{PIDE\_target} - \eta_{PIDE}$, where $\eta_{PIDE}$ is specified by the integral $$n_{PIDE} = \frac{1}{0.8\ \mu m - 0.4\ \mu m} \int_{0.4\ \mu m}^{0.8\ \mu m} \eta(\lambda),$$

satisfies a termination condition. In particular, the termination condition can be reaching a maximum of $\eta_{PIDE}$. Such a maximum is identified in the present embodiment by virtue of the fact that $\Delta\eta_{PIDE}$ becomes minimal if the value "1" is specified as $\eta_{PIDE\_target}$ in step S1 or if no value for the value of $\eta_{PIDE\_target}$ is specified in step S1 and instead use is made of the error function $\Delta\eta_{PIDE} = 1 - \eta_{PIDE}$. As an alternative, the termination condition can also consist of the condition $\Delta\eta_{PIDE} \leq 0$ being satisfied, where a value sufficiently smaller than "1", in particular, then is specified in step S1 as $\eta_{PIDE\_target}$.

The values of $n_{max}(\lambda_0)$, $n_{min}(\lambda_0)$, $v_{max}$, $v_{min}$, $P_{g,F,1}$, and $P_{g,F,2}$ are incorporated within the scope of the optimization by the Cauchy equation into the refractive index n(h) and hence into the spectral diffraction efficiency η(λ) over which integration is carried out. Limits for the values of $n_{max}(\lambda_0)$, $n_{min}(\lambda_0)$, $v_{max}$, $v_{min}$, $P_{g,F,1}$, and $P_{g,F,2}$ are given by the available materials. These boundaries can optionally be included in the optimization as boundary conditions.

Instead of optimizing of $n_{max}(\lambda_0)$, $n_{min}(\lambda_0)$, $v_{max}$, $v_{min}$, $P_{g,F,1}$, and $P_{g,F,2}$, it is also possible to provide one or two of these variables with fixed values and only optimize the remaining free variables. $P_{g,F,1}$ and $P_{g,F,2}$, in particular, can be provided with fixed values in this case since $\eta_{PIDE}$ has a smaller dependence on $P_{g,F,1}$ and $P_{g,F,2}$ than on $n_{max}(\lambda_0)$, $n_{min}(\lambda_0)$, $v_{max}$, and $v_{min}$. Although it is advantageous if $P_{g,F,1} > P_{g,F,2}$, the invention can also be realized with $P_{g,F,1} = P_{g,F,2}$ and even with $P_{g,F,1} < P_{g,F,2}$, provided the difference between $P_{g,F,1}$ and $P_{g,F,2}$ does not become too large in terms of magnitude in the latter case.

Moreover, there is the option of carrying out the optimization not only in view of the highest possible diffraction efficiency $\eta_{PIDE}$ averaged over a spectral range but additionally also in view of the lowest possible profile height h. In addition to the error function $\Delta\eta_{PIDE} = 1 - \eta_{PIDE}$ or the error function $\Delta\eta_{PIDE} = \eta_{PIDE\_target} - \eta_{PIDE}$ being minimized, the profile height h is then also minimized. Instead of minimizing the profile height h, there is also the option of specifying a maximum profile height $h_{max}$ in step S1 and of carrying out the optimization under the boundary condition that the equation $h \leq h_{max}$ is satisfied.

After the design of the diffractive structure has been completed in step S2, a first material, which has the maximum refractive index $n_{max}(\lambda_0)$ at the specified wavelength $\lambda_0$ ascertained during the optimization and the Abbe number $v_{max}$ ascertained during the optimization, and a second material, which has the minimum refractive index $n_{min}(\lambda_0)$ at the specified wavelength $\lambda_0$ ascertained during the optimization and the Abbe number $v_{min}$ ascertained during the optimization and the values of $P_{g,F,1}$ and $P_{g,F,2}$, which were ascertained during the optimization or set, are selected in step S3. By way of example, materials with the appropriate values for $n_{max}(\lambda_0)$, $v_{max}$, and $P_{g,F,1}$ and the appropriate values for $n_{min}(\lambda_0)$, $v_{min}$, and $P_{g,F,2}$ can be provided as composites of materials with embedded nanoparticles. In particular, polymers such as polymethylmethacrylate (abbreviated PMMA) or polycarbonates (abbreviated PC) can be considered for materials in which the nanoparticles are embedded. By way of example, the nanoparticles can consist of oxides such as indium tin oxide (ITO), zirconium dioxide ($ZrO_2$), titanium dioxide ($TiO_2$), or of diamond.

In step S4, the diffractive optical element with the designed diffractive structure then is produced by way of 3-D printing. In the process, the selected materials are supplied to the 3-D printer with a time-varying mixing ratio. Here, the time variation of the mixing ratio is matched to the geometry of the diffractive structure to be printed, in such a way that the regions 7 of the diffractive structure which should have the maximum refractive index $n_{max}(\lambda_0)$, the Abbe number $v_{max}$, and the part partial dispersion $P_{g,F,1}$ (cf. FIGS. 1 and 5) are printed using the first material only and the regions 5 of the diffractive structure which should have the minimum refractive index $n_{min}(\lambda_0)$, the Abbe number $v_{min}$, and the part partial dispersion $P_{g,F,2}$ are printed using the second material only. The regions of the sections of the sequence of adjoining sections 3A to 3D located between these regions 5, 7 are printed with a mixing ratio of the first material and the second material, which changes continuously from 100% first material to 100% second material. If a printer with a plurality of printing nozzles is used, the time-varying mixing ratio can be replaced by different mixing ratios being supplied to the different printing nozzles.

Alternatively, there also is the option of producing the diffractive structure 2 of the diffractive optical element 1 by means of a single material supplied to the printer, which material is doped with nanoparticles during printing, rather than by means of a varying material mixture, wherein the doping of the material is varied over time in such a way that the regions 7 of the diffractive structure which should have the maximum refractive index $n_{max}(\lambda_0)$, the Abbe number $v_{max}$, and the part partial dispersion $P_{g,F,1}$ (cf. FIGS. 1 and 5) have a first doping and the regions 5 of the diffractive structure which should have the minimum refractive index $n_{min}(\lambda_0)$, the Abbe number $v_{min}$, and the part partial dispersion $P_{g,F,2}$ have a second doping that differs from the first doping. The doping of the base material is then implemented in such a way that, within each section 3Ab to 3D of the diffractive structure 3, the doping changes continuously from the first doping to the second doping value. In this case, the first and second doping can represent a maximum and minimum doping with the same doping material, or two instances of doping with different doping materials.

In a further alternative, it is possible to initially provide a body made of a base material, for example by means of 3-D printing, and for the base material to be subsequently provided by means of a spatially varying doping. The spatial variation of the doping is then designed in such a way that there is a continuous change of the doping from a first doping to a second doping value within each section 3Ab to 3D of the diffractive structure 3.

The present invention has been described in detail on the basis of exemplary embodiments for explanatory purposes. However, a person skilled in the art recognizes that within the scope of the invention there can be a deviation from the exemplary embodiments, in order thus to realize further embodiment variants. By way of example, the polychromatic integral diffraction efficiency considered in the embodiment can be replaced by another diffraction efficiency averaged over a spectral range for as long as the diffraction efficiency averaged over the spectral range represents a suitable measure for the degree of efficiency achromatization achieved. Moreover, other polymer materials and nanoparticle materials to those specified in the exemplary embodiments can in principle also be considered for the materials with embedded nanoparticles. Therefore, the present invention is not intended to be restricted by the exemplary embodiments described, but only by the appended claims.

The invention claimed is:

1. A diffractive optical element, comprising:
   a material with a spatial variation in the refractive index,
   wherein a sequence of laterally adjoining sections is formed by the spatial variation in the refractive index, wherein a refractive index within each of the sections varies laterally, and which sequence forms a diffractive structure, and
   wherein the diffractive structure comprises one single layer and has a polychromatic integral diffraction efficiency of at least 0.95 over a spectral range extending over at least 300 nm,
   wherein a value of the diffraction efficiency of at least 0.95 averaged over the spectral range of at least 300 nm is provided by the diffractive structure with a combination of at least an optimized maximum refractive index $n_{max}$ and an optimized minimum refractive index $n_{min}$ and at least an optimized high Abbe number $v_{max}$ and an optimized low Abbe number $v_{min}$ within each section of the sequence of laterally adjoining sections.

2. The diffractive optical element of claim 1, wherein the value of the diffraction efficiency of at least 0.95 averaged over the spectral range of at least 300 nm is provided by a single one-layer diffractive structure with a combination of at least an optimized maximum refractive index $n_{max}$ at a specific wavelength of the spectral range of at least 300 nm, an optimized minimum refractive index $n_{min}$ at the specific wavelength of the spectral range of at least 300 nm, an optimized high Abbe number $v_{max}$ and an optimized low Abbe number $v_{min}$ within each section of the sequence of laterally adjoining sections.

3. The diffractive optical element of claim 2, wherein, in addition to the combination of at least the optimized maximum refractive index $n_{max}$ at a specific wavelength of the spectral range of at least 300 nm, the optimized minimum refractive index $n_{min}$ at the specific wavelength of the spectral range of at least 300 nm, the optimized high Abbe number $v_{max}$ and the optimized low Abbe number $v_{min}$, there also is an optimized first part partial dispersion and an optimized second part partial dispersion within each section.

4. The diffractive optical element of claim 1, wherein the optimized high Abbe number $v_{max}$ is located in a region with the optimized maximum refractive index $n_{max}$ and the optimized low Abbe number $v_{min}$ is located in a region with the optimized minimum refractive index $n_{min}$.

5. The diffractive optical element of claim 4, wherein a refractive index difference $\Delta n$ between the optimized maximum refractive index $n_{max}$ and the optimized minimum refractive index $n_{min}$ has at least a value of 0.005.

6. The diffractive optical element of claim 4, wherein an Abbe number difference $\Delta v$ between the optimized high Abbe number $v_{max}$ and the optimized low Abbe number $v_{min}$ has at least a value of 8.

7. The diffractive optical element of claim 1, wherein the sequence of laterally adjoining sections forms a diffractive structure with variable lateral dimensions of the laterally adjoining sections, which defines a varying diffraction angle depending on a location on the diffractive structure.

8. The diffractive optical element of claim 1, wherein the diffractive structure comprises a doped material, and wherein the spatial variation in the refractive index is based on a variation of the doping.

9. The diffractive optical element of claim 1, wherein the diffractive structure comprises a material mixed from at least two materials with different refractive indices, and wherein the spatial variation in the refractive index is based on the variation of the mixing ratio of the materials from which the mixed material is mixed.

10. The diffractive optical element of claim 1, wherein the diffractive structure comprises alternating first regions of a first material with a first refractive index and second regions of a second material with a second refractive index that is higher than the first refractive index,
wherein the first and the second regions in each case alternate within the laterally adjoining sections of the sequence of laterally adjoining sections,
wherein the width of the second regions vis-à-vis the width of the first regions within the laterally adjoining sections respectively increases from one end of the section to the other end of the section, and
wherein a greatest width of the first regions and the second regions is always less than a mean wavelength of the spectral range extending over at least 300 nm.

11. The diffractive optical element of claim 10, wherein the greatest width of the first regions and the second regions is always less than 0.3-times the mean wavelength of the spectral range extending over at least 300 nm.

12. The diffractive optical element of claim 10, wherein the greatest width of at least the second regions is at least 0.3-times the mean wavelength of the spectral range extending over at least 300 nm and at most 1.0-times the mean wavelength of the spectral range extending over at least 300 nm.

13. The diffractive optical element of claim 1, wherein at least two maxima of the spectral diffraction efficiency are present in the spectral range extending over at least 300 nm.

14. The diffractive optical element of claim 13, wherein, in the case of at least two maxima, the wavelengths at which an outer two of the two maxima are located differ by at least 150 nm from one another.

15. A refractive or reflective optical element, comprising the diffractive optical element of claim 1.

16. A method for designing an efficiency-achromatized diffractive structure comprising one single layer with a spatial variation in the refractive index, wherein as a result of the spatial variation in the refractive index a sequence of laterally adjoining sections is formed and the refractive index within the laterally adjoining sections in each case varies laterally between a maximum refractive index $n_{max}$ and a minimum refractive index $n_{min}$, the method comprising:
specifying a spectral range extending over at least 300 nm and a diffraction efficiency to be obtained averaged over the spectral range of at least 300 nm;
optimizing at least the maximum refractive index $n_{max}$ and the minimum refractive index $n_{min}$ within the laterally adjoining sections and a high Abbe number $v_{max}$ assigned to the maximum refractive index $n_{max}$ and a low Abbe number $v_{min}$ assigned to the minimum refractive index $n_{min}$ within the laterally adjoining sections such that at least the specified diffraction efficiency to be obtained averaged over the spectral range of at least 300 nm is attained.

17. The method of claim 16, further comprising, in addition to the maximum refractive index $n_{max}$, the minimum refractive index $n_{min}$, the high Abbe number $v_{max}$, and the low Abbe number $v_{min}$, optimizing a first part partial dispersion assigned to the maximum refractive index $n_{max}$ and a second part partial dispersion assigned to the minimum refractive index $n_{min}$ such that at least the specified diffraction efficiency averaged over the spectral range of at least 300 nm is attained.

18. The method of claim 16, wherein the optimization of the maximum refractive index $n_{max}$, of the minimum refractive index $n_{min}$, of the high Abbe number $v_{max}$, and of the low Abbe number $v_{min}$ is such that a profile height does not exceed a specified maximum value.

19. The method of claim 16, wherein the optimization of the maximum refractive index $n_{max}$, of the minimum refractive index $n_{min}$, of the high Abbe number $v_{max}$, and of the low Abbe number $v_{min}$ is such that at least two maxima of the spectral diffraction efficiency are present.

20. The method of claim 19, wherein the optimization of the maximum refractive index $n_{max}$, of the minimum refractive index $n_{min}$, of the high Abbe number $v_{max}$, and of the low Abbe number $v_{min}$ is such that the at least two maxima are spaced apart from one another by at least 150 nm.

21. A method for producing an efficiency-achromatized diffractive optical element, the method comprising:

designing a diffractive structure according to the method of claim 16;

creating the diffractive structure using a doped material and varying the doping or with the aid of a mixed material and varying the mixing ratio, wherein the doping or the mixing ratio determines at least the refractive index and the Abbe number of the doped or mixed material; and varying the doping or the mixing ratio such that at least the variations in the refractive index and in the Abbe number arising from the optimization are produced by varying the doping or varying the mixing ratio.

22. The method of claim 21, further comprising printing the diffractive structure via 3-D printing of the doped or mixed material, and varying the doping or the mixing ratio of the doped or mixed material during the printing step.

23. The method of claim 21, further comprising introducing a spatially varying doping into a body made of a base material.

* * * * *

UNITED STATES PATENT AND TRADEMARK OFFICE
CERTIFICATE OF CORRECTION

PATENT NO. : 12,253,695 B2
APPLICATION NO. : 17/603714
DATED : March 18, 2025
INVENTOR(S) : Werdehausen et al.

It is certified that error appears in the above-identified patent and that said Letters Patent is hereby corrected as shown below:

In the Specification

Column 7, Line 48: Delete:
"the difference $\Delta n(\lambda) = n_{max}(\lambda) - n_{max}(v)$ as a function of the"
And replace with:
-- the difference $\Delta n(\lambda) = n_{max}(\lambda) - n_{max}(\lambda)$ as a function of the --

Column 10, Lines 1-2: Delete:
"density, which represents a region with a minimum refractive index $n_{min}(\lambda_0)$ in relation to a specific wavelength zo of"
And replace with:
-- density, which represents a region with a minimum refractive index $n_{min}(\lambda_0)$ in relation to a specific wavelength $\lambda_0$ of --

Column 10, Line 28: Delete:
"phase shift of j×2n in the case of a transmission through the"
And replace with:
-- phase shift of j×2π in the case of a transmission through the --

Column 16, Line 47: Delete:
"differences $\lambda v$ are advantageous. The combinations of"
And replace with:
-- differences $\Delta v$ are advantageous. The combinations of --

Column 17, Line 13: Delete:
"$n_{max}((\lambda_0)$ in relation to a transmission through the region"
And replace with:
-- $n_{max}(\lambda_0)$ in relation to a transmission through the region --

Signed and Sealed this
Fourteenth Day of October, 2025

John A. Squires
*Director of the United States Patent and Trademark Office*

Column 21, Line 3: Delete:
"by the Cauchy equation into the refractive index n(h) and"
And replace with:
-- by the Cauchy equation into the refractive index n($\lambda$) and --